US009348724B2

(12) United States Patent
Ota et al.

(10) Patent No.: US 9,348,724 B2
(45) Date of Patent: May 24, 2016

(54) METHOD AND APPARATUS FOR MAINTAINING A WORKLOAD SERVICE LEVEL ON A CONVERGED PLATFORM

(75) Inventors: Hiromichi Ota, Redmond, WA (US); Yoshiki Kano, Bellevue, WA (US); Atsushi Murase, Bellevue, WA (US)

(73) Assignee: HITACHI, LTD., Tokyo (JP)

( * ) Notice: Subject to any disclaimer, the term of this patent is extended or adjusted under 35 U.S.C. 154(b) by 527 days.

(21) Appl. No.: 13/476,895

(22) Filed: May 21, 2012

(65) Prior Publication Data

US 2013/0311989 A1 Nov. 21, 2013

(51) Int. Cl.

*G06F 9/455* (2006.01)
*G06F 9/50* (2006.01)
*G06F 11/07* (2006.01)
*G06F 11/34* (2006.01)

(52) U.S. Cl.

CPC ........ *G06F 11/3485* (2013.01); *G06F 9/45558* (2013.01); *G06F 9/5088* (2013.01); *G06F 11/0712* (2013.01); *G06F 11/0775* (2013.01); *G06F 11/3442* (2013.01); *G06F 2009/4557* (2013.01); *G06F 2201/815* (2013.01)

(58) Field of Classification Search

None

See application file for complete search history.

(56) References Cited

U.S. PATENT DOCUMENTS 8,539,557 B1 * 9/2013 Buckner ................. G06F 21/31 726/4
9,135,031 B1 * 9/2015 Knight .................... G06F 9/455
2006/0085668 A1 4/2006 Garrett
2006/0195715 A1 * 8/2006 Herington ......................... 714/4
2008/0244579 A1 * 10/2008 Muller .......................... 718/100
2009/0077552 A1 * 3/2009 Sekiguchi ........... G06F 9/45558 718/1
2010/0115049 A1 * 5/2010 Matsunaga ........... G06F 3/0626 709/216
2010/0306767 A1 * 12/2010 Dehaan ............................. 718/1
2011/0107148 A1 * 5/2011 Franklin ............. G06F 11/0712 714/37
2012/0023115 A1 * 1/2012 Nagai ................. G06F 11/0727 707/756
2012/0030404 A1 * 2/2012 Yamamoto ............ G06F 3/0605 711/6
2012/0084445 A1 * 4/2012 Brock et al. .................. 709/226

* cited by examiner

*Primary Examiner* — Abdullah Al Kawsar

(57) ABSTRACT

A management server is provided in a computer system having one or more hosts, one or more storage systems and one or more switches, the hosts having a plurality of virtual machines, each virtual machine being defined according to a service level agreement. The management server is operable to manage the virtual machines and resources associated with the virtual machines; receive a notification of an event from a node in the computer system; determine if the event affects a service level agreement for any of the virtual machines defined in the computer system, the service level agreements listing required attributes for the corresponding virtual machines; allocate a new resource for a virtual machine whose service level agreement is affected by the event; and move the virtual machine whose service level agreement is affected by the event to the newly allocated resource.

19 Claims, 44 Drawing Sheets

1000

| Host ID (1010) | VM ID (1020) |
|---|---|
| H1 | VM1 |
| H1 | VM2 |
| H1 | VM3 |
| H1 | VM4 |
| H3 | VM5 |
| H3 | VM6 |
| H3 | VM7 |
| H3 | VM8 |
| H6 | VM9 |
| ... | ... |

| Storage ID (1110) | Volume ID (1120) | VM ID (1130) | Data Size of VM (1140) |
|---|---|---|---|
| S1 | V1A | VM1 | 50 GB |
| S1 | V1A | VM2 | 50 GB |
| S1 | V1A | VM3 | 50 GB |
| S1 | V1A | VM4 | 50 GB |
| S1 | V1C | VM5 | 50 GB |
| S1 | V1C | VM6 | 50 GB |
| S1 | V1C | VM7 | 50 GB |
| S1 | V1C | VM8 | 50 GB |
| S2 | V1F | VM9 | 50 GB |
| ... | ... | ... | |

| Host ID (1210) | IF ID (1220) | Network ID (1230) |
|---|---|---|
| H1 | I1 | N1 |
| H1 | I4 | N2 |
| H2 | I2 | N1 |
| H2 | I5 | N2 |
| H3 | I3 | N1 |
| H3 | I6 | N2 |
| H4 | I7 | N3 |
| H4 | I10 | N4 |
| H5 | I8 | N3 |
| H5 | I11 | N4 |
| H6 | I9 | N3 |
| H6 | I12 | N4 |
| … | … | … |

| Host IF ID (1310) | Storage IF ID (1320) | Volume ID (1330) |
|---|---|---|
| I1 | SI1 | V1A |
| I1 | SI1 | V1B |
| I2 | SI1 | V1A |
| I2 | SI1 | V1B |
| I3 | SI3 | V1C |
| I4 | SI4 | V1A |
| I4 | SI4 | V1B |
| I5 | SI4 | V1A |
| I5 | SI4 | V1B |
| I6 | SI2 | V1C |
| I9 | SI5 | V1F |
| I12 | SI8 | V1F |
| ... | ... | ... |

| Host ID | Number of Cores |
|---|---|
| H1 | 4 |
| H2 | 4 |
| H3 | 4 |
| H4 | 4 |
| H5 | 4 |
| H6 | 4 |
| ... | ... |

| Cluster ID (1510) | Host ID (1520) |
|---|---|
| C1 | H1 |
| C1 | H2 |
| ... | ... |

| Host ID (1610) | Threshold date (1620) |
|---|---|
| H5 | 15:00 Jan.17.2012 |
| H6 | 15:00 Jan.17.2012 |
| ... | ... |

| VM ID (1710) | Number of Nodes (1720) | Number of Parity Disks (1730) | Number of Paths (1740) | Tier (1750) | Core (1760) | Continuity (1770) | Score (1780) |
|---|---|---|---|---|---|---|---|
| VM1 | 2 | 1 | 2 | 1 | 1 | On | 100% |
| VM2 | 2 | 0 | 1 | 1 | 1 | On | 100% |
| VM3 | 2 | 0 | 1 | 1 | 1 | On | 100% |
| VM4 | 2 | 0 | 1 | 1 | 1 | Off | 100% |
| VM5 | 1 | 1 | 2 | 2 | 1 | Off | 100% |
| VM6 | 1 | 1 | 2 | 2 | 1 | Off | 100% |
| VM7 | 1 | 1 | 2 | 2 | 1 | Off | 100% |
| VM8 | 1 | 1 | 2 | 2 | 1 | Off | 100% |
| VM9 | 1 | 1 | 2 | 2 | 1 | On | 100% |
| ... | ... | ... | ... | ... | ... | | |

| Storage ID (1810) | Pool ID (1820) | Pool Volume ID (1830) |
|---|---|---|
| S1 | P1A | PV1A |
| S1 | P1A | PV1B |
| S1 | P1B | PV1C |
| S2 | P1D | PV1F |
| ... | ... | ... |

| Storage ID (1910) | Pool Volume ID (1920) | Array Group ID (1930) |
|---|---|---|
| S1 | PV1A | A1A |
| S1 | PV1B | A1B |
| S1 | PV1C | A1C |
| S2 | PV1F | A1F |
| ... | ... | ... |

| Storage ID (2010) | Pool ID (2020) | Free Capacity (2030) | Total Capacity (2040) |
|---|---|---|---|
| S1 | P1A | 100 GB | 300 GB |
| S1 | P1B | 800 GB | 1 TB |
| S2 | P1D | 800 GB | 1 TB |
| … | … | … | |

| Storage ID (2110) | Array Group ID (2120) | Free Capacity (2130) | Tier (2140) | Number of Parity Disks (2150) |
|---|---|---|---|---|
| S1 | A1A | 20 GB | 1 | 1 |
| S1 | A1B | 20 GB | 1 | 2 |
| S1 | A1C | 1 TB | 2 | 1 |
| S2 | A1D | 1 TB | 1 | 1 |
| S2 | A1F | 1 TB | 1 | 2 |
| S2 | A1F | 1 TB | 2 | 1 |
| ... | ... | ... | | |

| Storage ID (2210) | Thin Provisioned Volume ID (2220) | Pool ID (2230) | Free Capacity (2240) |
|---|---|---|---|
| S1 | V1A | P1A | 1 TB |
| S1 | V1B | P1A | 1 TB |
| S1 | V1C | P1B | 1 TB |
| S2 | V1F | P1D | 1TB |
| ... | ... | ... | |

| Storage ID | IF ID | Network ID |
|---|---|---|
| S1 | SI1 | N1 |
| S1 | SI2 | N2 |
| S1 | SI3 | N1 |
| S1 | SI4 | N2 |
| S2 | SI5 | N3 |
| S2 | SI6 | N4 |
| S2 | SI7 | N3 |
| S2 | SI8 | N4 |
| ... | ... | ... |

| Switch ID | Network ID |
| --- | --- |
| SW1 | N1 |
| SW2 | N2 |
| SW3 | N3 |
| SW4 | N4 |
| ... | ... |

| Auto Migratio n (2510) | Minimum Pool Size (2520) | Minimum Thin Provisioned Volume Size (2530) | Pool Threshold (2540) |
|---|---|---|---|
| On | 1 TB | 1TB | 10% |

| Storage ID (1810) | Pool ID (1820) | Pool Volume ID (1830) |
|---|---|---|
| S1 | P1A | PV1B |
| S1 | P1B | PV1C |
| S2 | P1D | PV1F |
| S3 | P1E | PV1G |
| ... | ... | ... |

| Storage ID (2110) | Array Group ID (2120) | Free Capacity (2130) | Tier (2140) | Number of Parity Disks (2150) |
|---|---|---|---|---|
| S1 | A1B | 20 GB | 1 | 2 |
| S1 | A1C | 1 TB | 2 | 1 |
| S2 | A1F | 1 TB | 2 | 1 |
| S3 | A1E | 10GB | 1 | 1 |
| ... | ... | ... | | |

| Storage ID (1910) | Pool Volume ID (1920) | Array Group ID (1930) |
|---|---|---|
| S1 | PV1B | A1B |
| S1 | PV1C | A1C |
| S2 | PV1F | A1F |
| S3 | PV1G | A1E |
| ... | ... | ... |

*FIG. 36*

| Storage ID | Pool ID | Free Capacity | Total Capacity |
|---|---|---|---|
| S1 | P1A | 100 GB | 300 GB |
| S1 | P1B | 800 GB | 1 TB |
| S2 | P1D | 800 GB | 1 TB |
| S3 | P1E | 100 GB | 300 GB |
| ... | ... | ... | |

| Storage ID (2210) | Thin Provisioned Volume ID (2220) | Pool ID (2230) | Free Capacity (2240) |
|---|---|---|---|
| S1 | V1A | P1A | 1 TB |
| S1 | V1B | P1A | 1 TB |
| S1 | V1C | P1B | 1 TB |
| S2 | V1F | P1D | 1TB |
| S3 | V1G | P1E | 1TB |
| ... | ... | ... | |

| Storage ID (2310) | IF ID (2320) | Network ID (2330) |
|---|---|---|
| S1 | SI1 | N1 |
| S1 | SI2 | N2 |
| S1 | SI3 | N1 |
| S1 | SI4 | N2 |
| S2 | SI5 | N3 |
| S2 | SI6 | N4 |
| S2 | SI7 | N3 |
| S2 | SI8 | N4 |
| S1 | SI9 | N5 |
| S1 | SI10 | N6 |
| S1 | SI11 | N5 |
| S1 | SI12 | N6 |
| S3 | SI13 | N5 |
| S3 | SI14 | N6 |
| S3 | SI15 | N5 |
| S3 | SI16 | N6 |
| ... | ... | ... |

| Switch ID (2410) | Network ID (2420) |
|---|---|
| SW1 | N1 |
| SW2 | N2 |
| SW3 | N3 |
| SW4 | N4 |
| SW5 | N5 |
| SW6 | N6 |
| ... | ... |

| Storage ID (4110) | Array Group ID (4120) | External Storage ID (4130) | External Volume ID (4140) |
|---|---|---|---|
| S1 | A1B | S3 | V1G |
| ... | ... | | |

*FIG. 41*

METHOD AND APPARATUS FOR MAINTAINING A WORKLOAD SERVICE LEVEL ON A CONVERGED PLATFORM

BACKGROUND OF THE INVENTION

The present invention relates to a method and apparatus for effectively maintaining service level agreements of virtual machines in a computer system such those in a converged platform.

In recent years, the use of server virtualization technology has been increasing in data centers in order to reduce operating expenses. Typical server virtualization environment in data centers are built on storage area networks (SANs), each of which includes physical servers connected to storage arrays by Fibre Channel networks. Virtual machines (VMs) run on the physical servers in the environment. VMs are usually managed by administrators who are called VM administrators.

Administrators called storage administrators and SAN administrators manage physical resources such as physical servers and storage components. Although topology of the physical resources has become complex due to an increase in the use of storage virtualization technologies, their complexities are hidden from VM administrators for simplicity.

VM administrators can set attributes about service level agreements (SLAs) to VMs, including SLAs pertaining to availability, disk I/O performance and usage rates of CPUs. VM administrators need to keep VMs running on the physical resources which meet SLAs of the VMs.

The migration technology of VMs allows VM administrators to satisfy SLAs of VMs by moving VMs to other physical resources. For example, if a VM is running on a server connected to an array group which includes SSD drives with two Fibre Channel paths and one of the paths is lost, VM administrators can move the VM to another physical server which is connected to SSD drives to satisfy SLAs on the availability and disk I/O performance of the VM.

However, VM administrators may have difficulty satisfying the SLA because they are not involved in managing the physical resources that define VMs. VM administrators do not know which physical resources have been used to define the VMs nor do they know the health of these physical resources. Storage and SAN administrators manage and monitor the topology of the physical resources. Therefore, it is difficult for VM administrators to detect failures of the physical resources that are used to define the VMs. Even if detected, VM administrators may have difficult time locating alternative resources that satisfy the SLA of a VM when the SLA is broken.

One attempt to satisfy SLAs of VMs is to migrate automatically the VMs if a failure or performance degradation of physical resources is detected. However, this approach does not suggest how the SLAs can be kept when appropriate destinations for VMs could not found, e.g., a VM running on a volume that is getting faulty cannot be moved to another volume if other previously identified volumes do not have enough free capacity to accommodate that VM, thereby making it difficult to satisfy the SLA. It would be desirable to provide VM administrators with means of more effectively keeping the SLAs of VMs.

BRIEF SUMMARY OF THE INVENTION

The present invention relates to a method and apparatus for effectively maintaining service level agreements (SLAs) of VMs in a computer system, e.g., in a converged platform. The converged platform is a system that integrates the functions of storage, switching, hosting, and management. Such a system may be provided in a single housing. Attributes of SLAs includes availability, disk I/O performance, data size, continuity, usage rates of CPUs, and so on.

Embodiments of the present invention are directed to providing VM administrators with means of keeping SLAs of VMs by monitoring events on physical resources that affect the SLAs and moving the VMs to other physical resources if a failure or other undesirable events are detected. An embodiment of the present invention is directed to means of maintaining information about the relationship between VMs and all physical resources of a system wherein the VMs are defined in order to facilitate dynamic allocation of new physical resources to VMs running on problematic physical resources. In an embodiment, physical resources of a system where VMs are running are monitored. If failures of physical resources are detected, suitable new physical resources that satisfy the SLAs are selected, and the affected VMs are dynamically allocated with the selected new resources.

In an embodiment, a management server is provided in a computer system having one or more hosts, one or more storage systems and one or more switches, the hosts having a plurality of virtual machines, each virtual machine being defined according to a service level agreement, each storage system having a storage controller and a plurality of storage devices. The management server includes a processor, a network interface, and a memory. The management server is operable to manage the virtual machines and resources associated with the virtual machines; receive a notification of an event from a node in the computer system; determine if the event affects a service level agreement for any of the virtual machines defined in the computer system, the service level agreements listing required attributes for the corresponding virtual machines; allocate a new resource for a virtual machine whose service level agreement is affected by the event; and move the virtual machine whose service level agreement is affected by the event to the newly allocated resource.

In an embodiment, a method for managing service level agreements of virtual machines in a computer system is disclosed. The computer system includes one or more hosts, one or more storage systems and one or more switches, the virtual machines running in the hosts, each storage system having a storage controller and a plurality of storage devices. The method includes receiving a notification of an event; determining if the event affects a service level agreement for any of the virtual machines defined in the computer system, the service level agreements listing required attributes for the corresponding virtual machines; allocating a new resource for a virtual machine whose service level agreement is affected by the event; and moving the virtual machine whose service level agreement is affected by the event to the newly allocated resource.

In an embodiment, a system includes one or more hosts, each host running a virtual machine; one or more storage systems, each storage system including a storage controller and a plurality of storage devices; one or more switches coupling the hosts and the storage systems; and a management server comprising a processor, a memory, and a non-transitory computer readable medium. The non-transitory computer readable medium of the management server comprises code for receiving a notification of an event; code for determining if the event affects a service level agreement for any of the virtual machines defined in the computer system, the service level agreements listing required attributes for the corresponding virtual machines; code for allocating a new resource for a virtual machine whose service level agreement is affected by the event; and code for moving the virtual machine whose service level agreement is affected by the event to the newly allocated resource.

BRIEF DESCRIPTION OF THE DRAWINGS

FIGS. 10-25 show exemplary embodiments of table information including data and identifiers for a storage system.

FIGS. 34-41 show exemplary embodiments of table information including data and identifiers for a storage system.

DETAILED DESCRIPTION OF THE INVENTION

The present invention relates to a method and apparatus for effectively maintaining service level agreements (SLAs) of VMs in a computer system, e.g., in a converged platform. The converged platform is a system that integrates the functions of storage, switching, hosting, and management. Such a system may be provided in a single housing. The system monitors events which affect SLAs of VMs. When the system detects a break of the SLA of a VM, the system allocates new resources for the VM and moves the VM thereto. The events monitored by the system include decrease in redundancy of components where VMs are running, scheduled shutdown or maintenance activities, and increase in data size of VMs. Resources which can be allocated by the system include volumes, pools, clusters which include physical servers, etc. SLAs list the required attributes of each VM is to be provided with by the computer system wherein it is defined. Attributes of SLAs includes availability, disk I/O performance, data size, continuity, usage rates of CPUs, and so on.

In an embodiment, a dynamic resource allocation server (DRAS) is used to manage SLAs of VMs in a server virtualization environment defined in a storage system including physical servers (or hosts) connected to storage arrays by Fibre Channel, FCoE or other networks. DRAS in conjunction with other components maintain information on relationship between VMs and all physical resources where the VMs running. Accordingly, DRAS can dynamically allocate new resources to a VM whose SLA is broken even if appropriate resources (e.g., predefined or reserved resources) do not exist at the time the SLA is broken.

In an embodiment, Hypervisor program or the like is used to define VMs on the physical servers. The storage arrays include array groups comprising storage media such as HDDs and SSDs, volumes on the array groups, pools, and volumes on the pools. DRAS manages physical servers, storage arrays, network components, VMs and Hypervisor programs. DRAS may be a software module implemented on a management server of the system.

Figure 1:
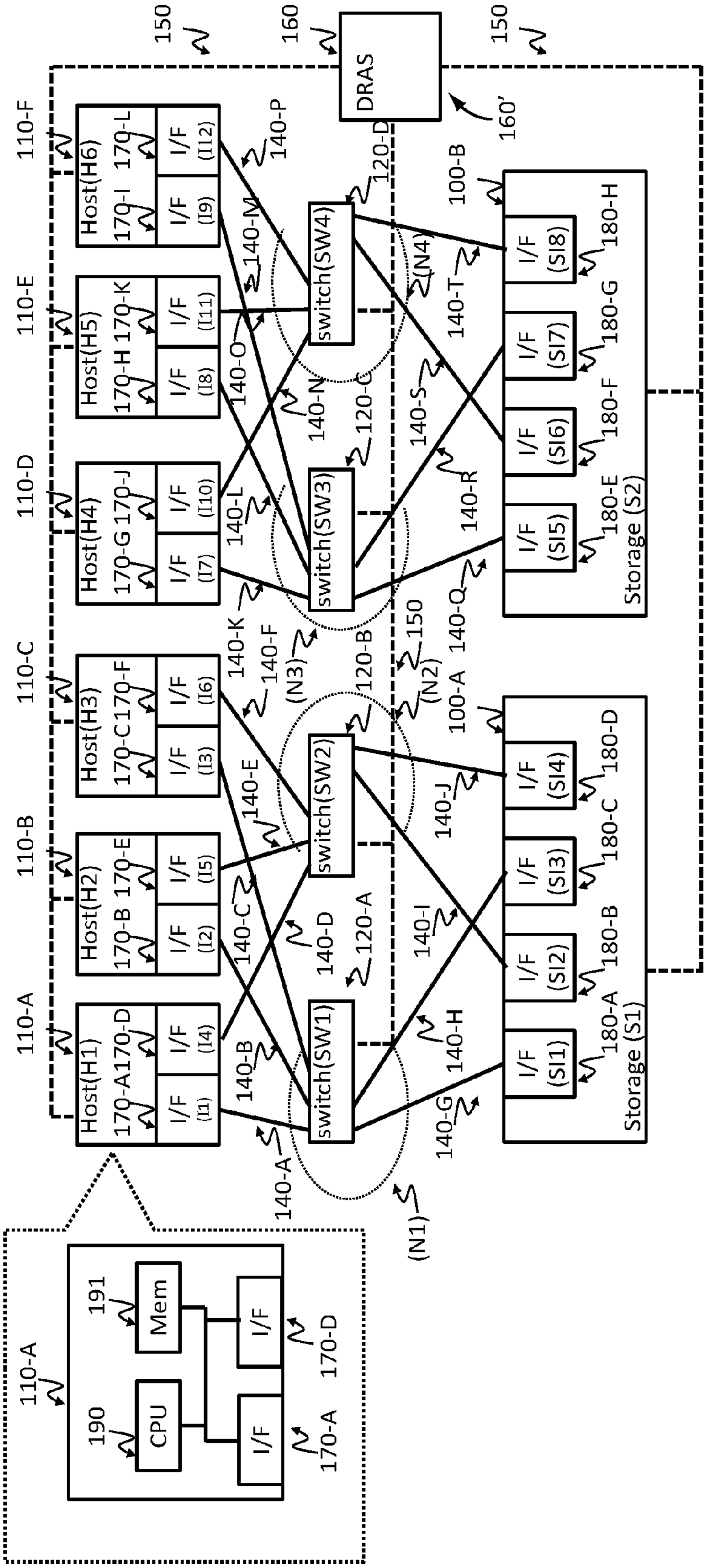
FIG. 1 shows a block diagram of an exemplary embodiment of hardware architecture of a storage system.

FIG. 1 shows a computer system 50 according an embodiment of the present invention. System 50 is provided in a converged platform according to an embodiment. System 50 includes storage systems 100A and 100B, hosts 110A-110F, switches 120A-120D, a dynamic resource allocation server (DRAS) 160, in-band networks 140, and out-of-band network 150. DRAS 160 may be hardware or software according to implementation. In an embodiment, DRAS 160 is implemented as a software module in a management server 160' that is configured to manage the resources of system 50. For illustrative convenience, DRAS 160 and management server 160' may be collectively referred to as DRAS 160. DRAS 160 may also be referred to as "resource management server" or "resource allocation server." In an embodiment, computer system 50 is provided as a converged platform and is enclosed in a single housing. In other embodiment, computer system 50 is provided in a plurality of housings.

Hosts 110 include network interfaces 170A-170L. Host 110A is a general purpose computer and includes a CPU 190, memory 191, and a plurality of interfaces 170A and 170C. In an embodiment, different hosts 110 may have different components. For example, host 110A may have different components than host 110B. However, for illustrative convenience, it is assumed that all hosts have the same components.

Hosts 110A-110C are connected to switch 120A by in-band networks 140A-140C via network interfaces 170A-170C and connected to switch 120B by in-band networks 140D-140F via network interfaces 170 D-170F, respectively. Hosts 110D-110F are connected to switch 120C by in-band networks 140K-140M via network interfaces 170G-170I and connected to switch 120D by networks 140L-140P via network interfaces 170J-170L, respectively.

In an embodiment, each storage system 100 includes a plurality of network interfaces 180. Storage system 100A is connected to switches 120A and 120B by in-band network 140G-140J via network interfaces 180A-180D, and storage system 100B is connected to switches 120C and 120D by in-band networks 140Q-140T via network interfaces 180E-180H. Although not illustrated in FIG. 1, storage system 100 includes a storage controller and a plurality of storage media such as hard disk drives and solid state drives.

Hosts 110A-110C are configured to communicate with storage system 100A via switches 120A-120B, and hosts 110D-110F are configured to communicate with storage system 100B via switches 120C-120D, respectively. DRAS 160 is connected to storage systems 100, hosts 110, and switches 120 via out-of-band network 150.

In an embodiment, identifiers of interfaces 170A-170L are defined as I1-I12, identifiers of hosts 110A-110F are defined as H1-H6, identifiers of switches 120A-120D are defined as SW1-SW4, identifiers of interfaces 180A-180H are defined as SI1-SI8, identifiers of networks created by SW1-SW4 are defined as N1-N4, and identifiers of storage systems 100A-100B) are defined as S1-S2, respectively.

Figure 2:
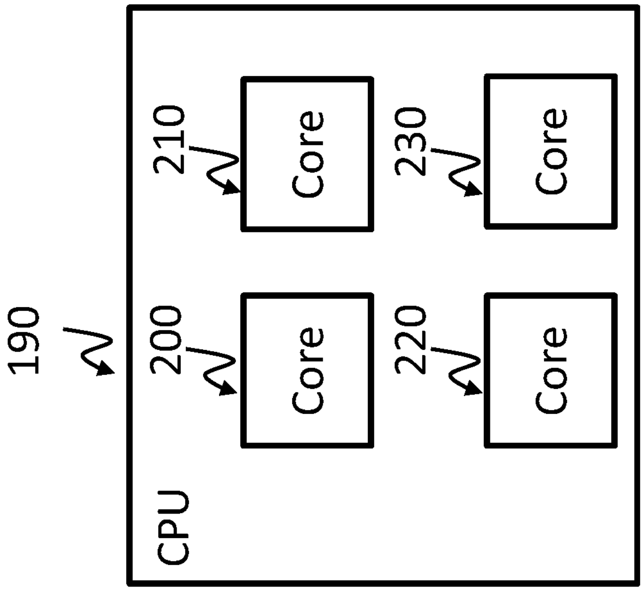
FIG. 2 shows a block diagram of an exemplary embodiment of CPU architecture.

FIG. 2 illustrates CPU 190 according to an embodiment of the present invention. CPU 190 includes a plurality of cores, e.g., first, second, third, and fourth cores 200-230.

Figure 3:
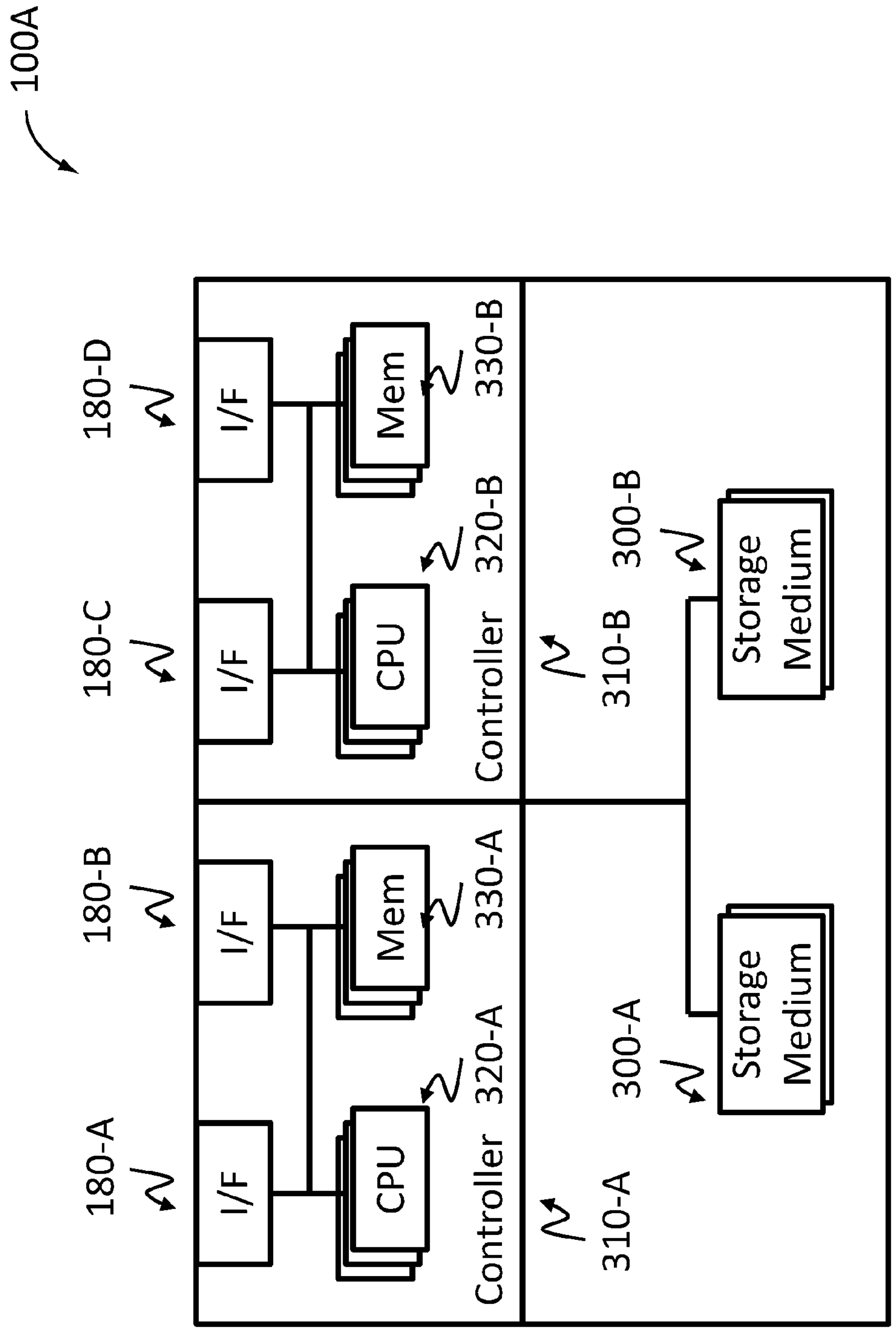
FIG. 3 shows a block diagram of an exemplary embodiment of hardware architecture of a storage system.

FIG. 3 illustrates storage system 100A according to an embodiment of the present invention. Storage system 110A includes controllers 310A and 310B. Each of the controllers 310 may include a plurality of CPUs 320, memories 330, and network interfaces 180. Controllers 310 are connected to a plurality of storage media 300A and 300B to manage access to storage media 300. Storage media 300 may comprise one or more solid state drive (SSD), hard disk drive (HDD), optical drive, magnetic tape drive, or other types of storage media that are capable of storing digital information. For illustrative convenience, storage media 300A are referred to as SSDs and storage media 300B are referred to HDDs.

Figure 4A:
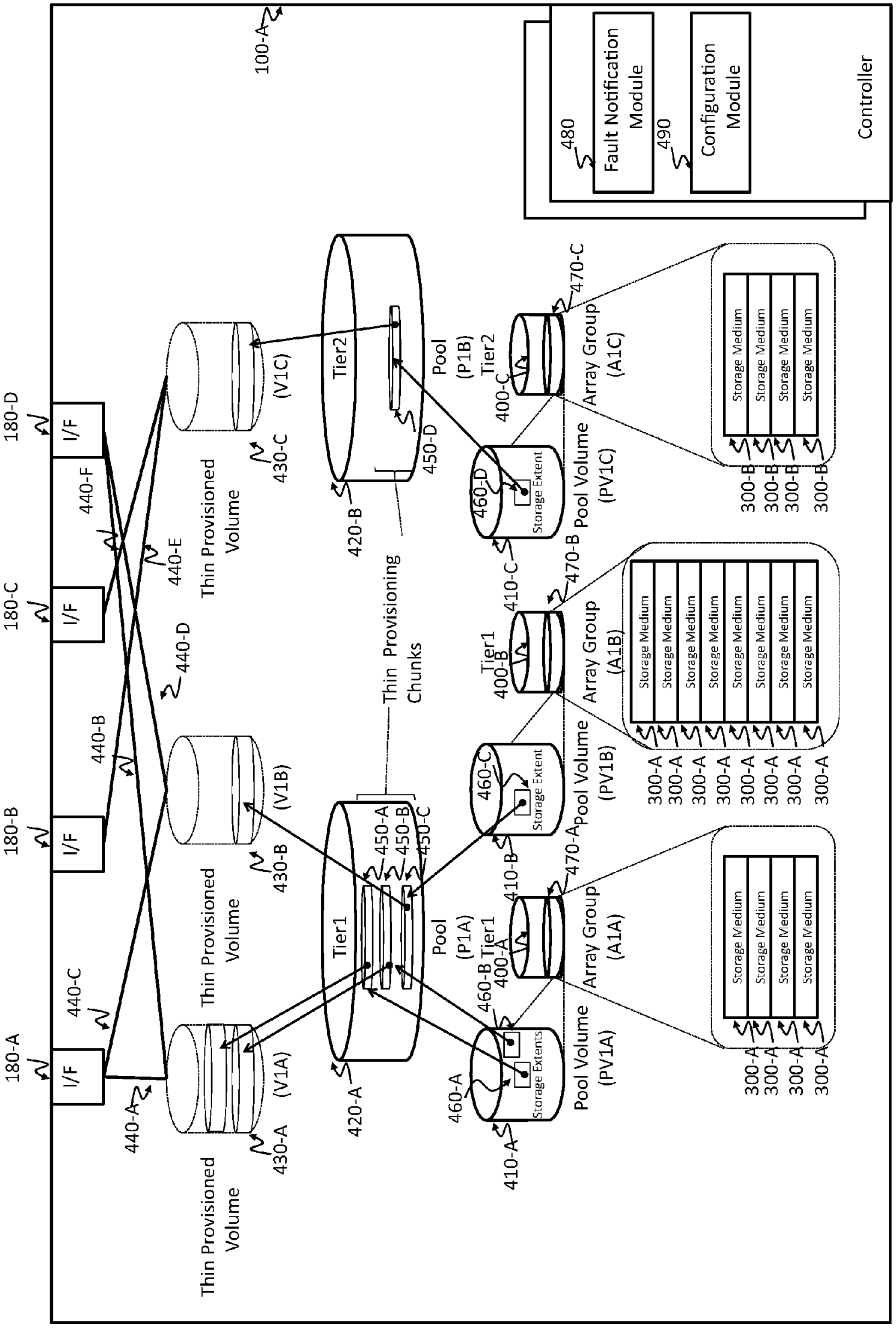
FIGS. 4A-4B show block diagrams of an exemplary embodiment of logical architecture of a storage system.

FIG. 4A shows exemplary logical elements of storage system 100A according to an embodiment of the present invention. Array groups 400A-400C are logical volumes, each of which is defined by a plurality of storage media 300A or 300B that may be arranged into redundant array of independent disk (RAID) Groups. For example, array group 400A may be arranged as RAID5 comprising three (3) data disks and one (1) parity disk. Other embodiments may include one or more array group 400, each of which may be arranged in a particular RAID level.

For illustrative convenience, it is assumed in the following exemplary embodiments that each array group 400 comprises storage media 300 of the same type. For example, array group 400A may include four of storage media 300A (SSDs), array group 400B may include eight of storage media 300A (SSDs), and array group 400C may include four of storage media 300B (HDD). In addition, it is assumed that array groups 400A and 400C are configured as RAID5 with 3 data disks and 1 parity disk, and array group 400B is configured as RAID6 with 6 data disks and 2 parity disks.

Pool volumes 410A-410C are volumes to be used in pools 420A-420B. Each pool volume reserves a part of an array group 400, so that the reserved area cannot be used by other pool volumes. In the embodiment shown in FIG. 4A, reserved area 470A is reserved by pool volume 410A, reserved area 470B is reserved by pool volume 410B, and reserved area 470C is reserved by pool volume 410C. The reserved areas are used to store data of storage extent 460A-460D. Free capacity of an array group is defined as the total capacity of areas of the array group which are not reserved by any pool volumes in the present embodiment.

Storage extents 460 are small pieces of storage area wherein data of thin provisioning chunks 450 are stored. In an embodiment, storage extents are allocated when thin provisioning chunks are allocated, and each thin provisioning chunk has one-to-one relationship with a storage extent. Thin provisioning chunk 450A is associated with storage extent 460A, thin provisioning chunk 450B is associated with storage extent 460B, thin provisioning chunk 450C is associated with storage extent 460C, and thin provisioning chunk 450D is associated with storage extent 460D.

Pools 420 may comprise one or more pool volumes 410. For example, as shown in FIG. 4A, pool 420A comprises pool volumes 410A-410B, and pool 420B comprises pool volume 410C. In an embodiment, free capacity of an array group is the total capacity of areas of the array group 400 that is not reserved by pool volumes 410.

In FIG. 4A, thin provisioned volumes 430A and 430B are associated with pool 420A. When a thin provisioned volume 430A receives a write data command from a host 110 to write to a logical address of the volume, the system determines whether a thin provisioning chunk 450 has been allocated on the logical address. If the chunk has not been allocated, thin provisioned volume 430A may create a new chunk on pool 420A and allocate the chunk to the logical address. When the chunk is created, a storage extent 460 is created on one of volumes 410A-410B and associated with the chunk.

When the extent 460 is created, if there is no free space on reserved areas 470A and 470B, the write data operation fails, and the system may enter a "Pool Full" state. In an embodiment, free capacity of a pool such as pool 420A may be defined as the total capacity of storage areas where any data are not stored on reserved areas 470A and 470B. The total capacity of a pool 420A may be defined as a total capacity of reserved areas 470A and 470B.

Thin provisioning chunks 450A-450D may be allocated in the same manner as described above. For example, in the embodiment shown in FIG. 4A, thin provisioning chunk 450A is created by thin provisioned volume 430A, thin provisioning chunks 450B and 450C are created by 430B, and thin provisioning chunk 450D is created by 430C.

In an embodiment, each of the thin provisioned volumes 430A-430C may have an upper limit of the number of provisioned chunks 450 which can be allocated to it. The upper limit is called the "maximum capacity" of a provisioned volume herein. The free capacity of a thin provisioned volume may be determined by subtracting the total capacity of chunks allocated to the volume from the maximum capacity of the volume.

Logical paths 440A-440F may associate thin provisioned volumes 430A-430C with network interfaces 180A-180D. A provisioned volume associated with a network interface can receive or send data via the network interface.

In the embodiment shown in FIG. 4A, thin provisioned volume 430A is associated with network interfaces 180A and 180D by logical paths 440A and 440B, volume 430B is associated with interfaces 180A and 180D by paths 440C-440D, and volume 430C is associated with interfaces 180B and 180C by paths 440E-440F.

In a storage system, storage media may be classified by tiers, where a higher tier of storage may comprise higher performance storage media than a lower tier of storage. In the embodiment shown in FIG. 4A, tier 1 comprises storage media 400A and 400B, thin provisioned volumes 430A and 430B, and pool 420A. In the same embodiment, tier 2 comprises storage media 400C, thin provisioned volume 430C, and pool 420B. Although not illustrated, the storage system may have storage media that are tier 3, tier 4, and lower.

The tier of pools which store data to storage media 400A is "tier 1" and the tier of pools which store data to storage media 400B is "tier 2." The tier of thin provisioned volumes which store data to tier1 pools is "tier 1" and the tier of thin provisioned volumes which store data to tier2 pools is "tier 2." In FIG. 4A, the tier of pool 420A is "tier 1" and the tier of pool 420B is "tier 2." The tier of thin provisioned volumes 430A-430B is "tier 1" and the tier of thin provisioned volume 420B is "tier 2."

In this example, identifiers of array groups 400A-400C are defined as A1A-A1C, identifiers of pool volumes 410A-410C are defined as PV1A-PV1C, identifiers of pools 420A-420B are defined as P1A-P1B, and identifiers of thin provisioned volumes 430A-430C are defined as V1A-V1C, respectively.

Storage controllers such as storage controller 310A and 310B of an exemplary system may include one or more software modules. For example, as seen in FIG. 4, storage system 100A may include a fault notification module 480.

In an embodiment, fault notification module 480 may send notifications to DRAS 160 via Out-of-Band Network 150 when a fault is detected in one of storage media 300A-300B. Each notification may include an identifier that identifies the array group which includes the failed medium. Fault notification module 480 may also send a notification when the ratio of free capacity of a pool 420 to total capacity of pool volumes of the pool becomes less than threshold, e.g., the threshold specified on allocation policy table 2500 shown in FIG. 25. The notification may include the identifier of the pool.

Another software module which may be included in an exemplary system is a configuration module 490. In an embodiment, configuration module 490 is configured to send configuration information of storage system 100A via Out-of-Band Network 150 when configuration module 490 receives requests from DRAS 160. For example, configuration module 490 may send information about array groups 400A-400C, storage media 300A and 300B, associations between array groups 400A-400C and storage media 300A and 300B, pool volumes 410A-410C, associations between array groups 400A-400C and 410A-410C, pools 420A-420B, association between pool volumes 410A-410C and pools 420A-420B, thin provisioned volumes 430A-430C, associations between thin provisioned volumes 430A-430C and pools 420A-420B, network interfaces 180A-180D, and associations between thin provisioned volumes 430A-430C and network interfaces 180A-180D.

In an embodiment, DRAS 160 can create pools, pool volumes, and thin provisioned volumes by using configuration module 490.

Figure 4B:
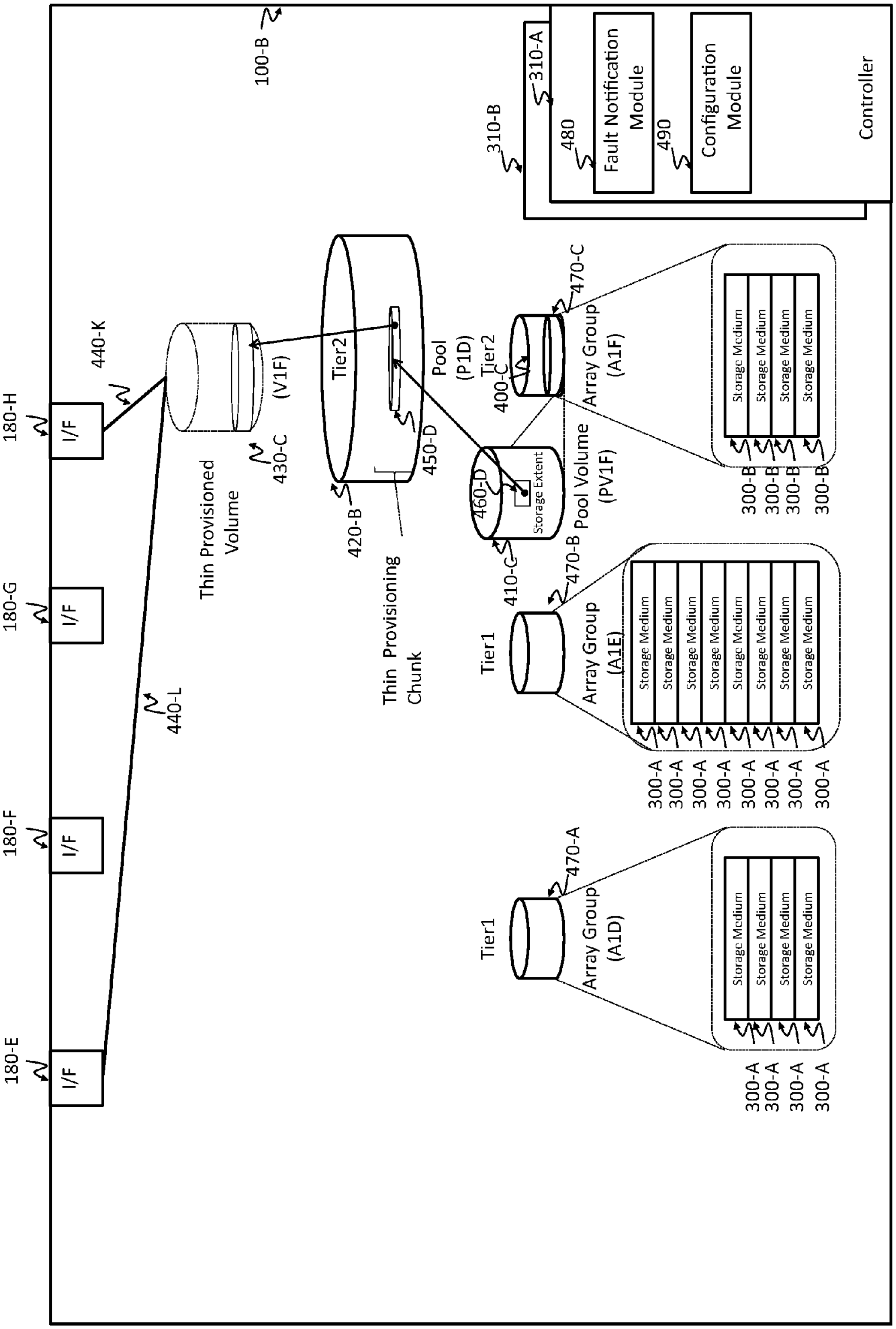

FIG. 4B shows an embodiment of a logical architecture of storage system 100B that is configured similar to the embodiment shown in FIG. 4A. However, storage system 100B does not include pool 420A of tier1, or the pool volumes and thin provisioned volume associated with the pool 420A.

In the embodiment shown in FIG. 4B, the identifiers of array group 470A-470C are defined as A1D-A1F, identifiers of pool volume 410C are defined as PV1F, the identifier of pool 420B is defined as P1D, and the identifier of thin provisioned volume 430C is defined as V1F in storage system 100B, respectively. The thin provisioned volume 430C is coupled to logical paths 440-K and 440-L which connect the thin provisioned volume V1F to interfaces 180E and 180-H, respectively.

Figure 5:
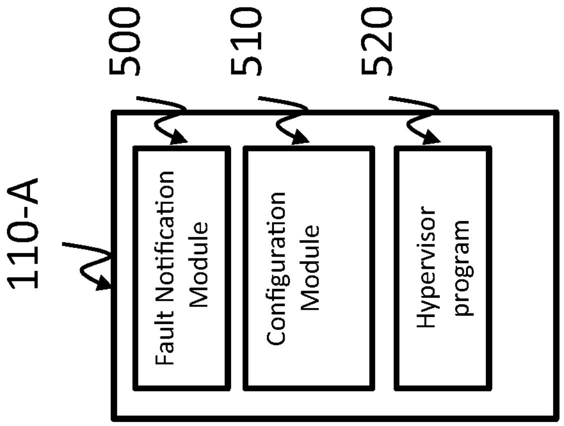
FIG. 5 shows a block diagram of an exemplary embodiment of a memory of a storage subsystem.

FIG. 5 shows an embodiment of logical elements of host 110A. In the embodiment, host 110A includes a fault notification module 500, a configuration module 510, and a Hypervisor program 520. One or more VMs may be executed on Hypervisor program 520. Although an embodiment may include a plurality of logical host elements 110 which include different elements from one another, for simplicity of the following description, it can be assumed that hosts 110B-110F have the same configuration as host 110A.

Fault notification module 520 sends notifications to DRAS 160 via Out-of-Band Network 150 when one of the network interfaces 170 fails. Each notification may include an identifier for one or more failed network interface 170.

Configuration module 510 sends network interface configuration information via Out-of-Band Network 150 in response to requests from DRAS 160. The network interface configuration information of interfaces includes a host identifier, VM identifier, data size of VMs, identifiers of particular thin provisioned volumes where VMs are executed, identifiers of network interfaces of hosts, identifiers of networks which network interfaces join, identifiers of network interfaces of storage systems to which network interfaces of hosts can connect, identifiers of network interfaces of storage systems which hosts use to access thin provisioned volumes, a number of cores included in a host, and identifiers of clusters which hosts join. In an embodiment, DRAS 160 moves VMs to other resources by using configuration module 510.

Figure 6:
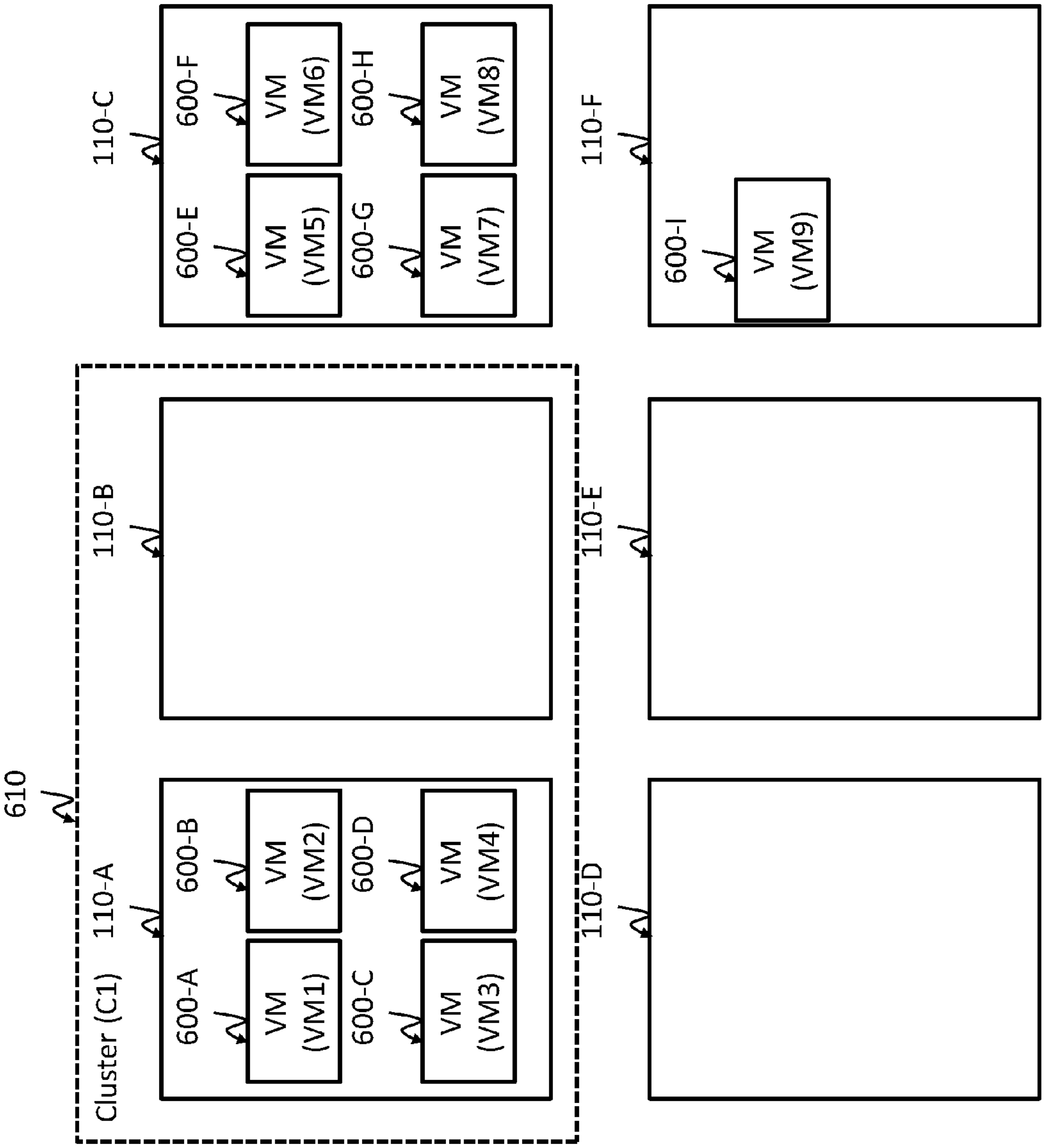
FIG. 6 shows a block diagram of an exemplary embodiment of locations of VMs on hosts.

FIG. 6 shows an example of host locations of VMs. VMs 600A-600D are placed on host 110A, VMs 600E-600H are placed on host 110C, and VM 600I is placed on host 110F. In this example, identifiers of VMs 600A-600I are VM1-VM9, respectively.

The cluster whose identifier is C1 comprises hosts 110A-110B. In embodiments, a plurality of thin provisioned volumes 430 may be coupled to a cluster, and one or more host 110 may be coupled to each thin provisioned volume in the cluster. However, in the following examples, it is assumed that all thin provisioned volumes connected to a host of a cluster are connected to all hosts associated with the cluster.

Figure 7:
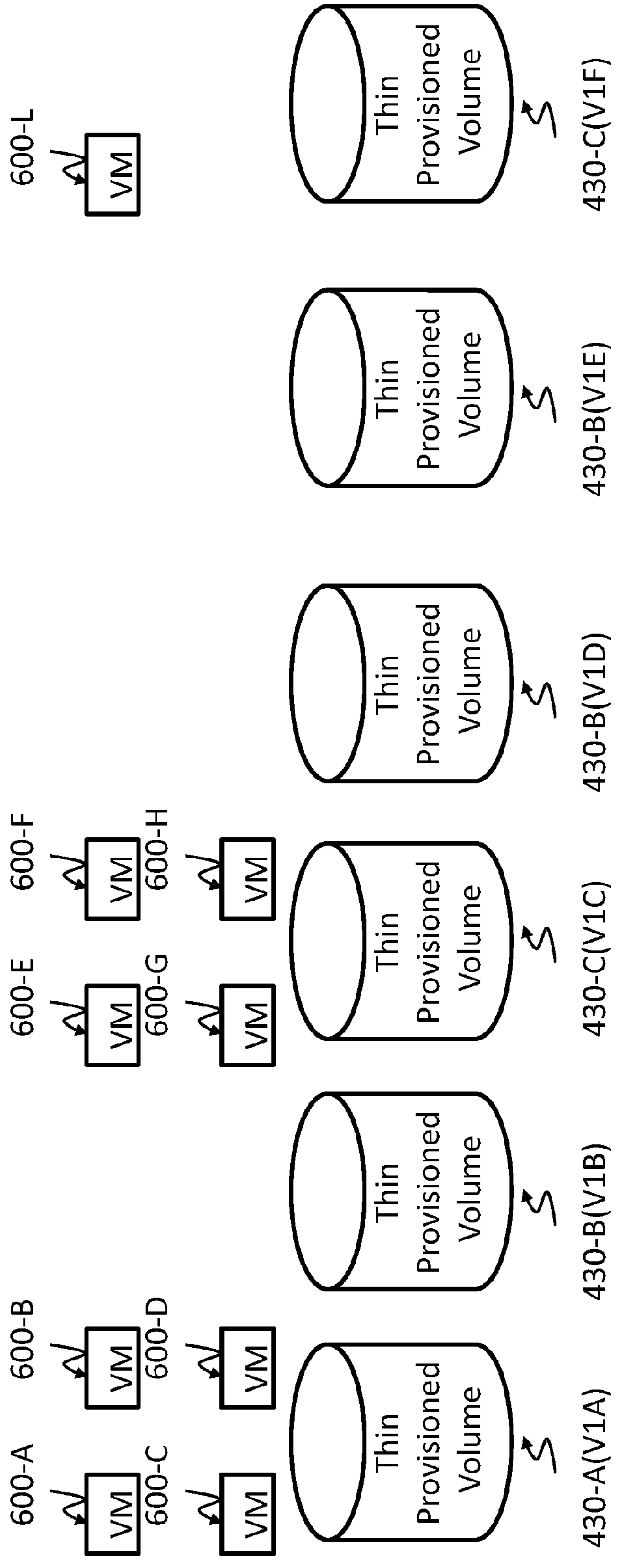
FIG. 7 shows a block diagram of an exemplary embodiment of storage locations of VMs.

FIG. 7 shows an example of the storage location of the data of VMs 600A-600I. In the example, data of VMs 600A-600D are placed on thin provisioned volume 430A (V1A), data of 600E-600H are placed on thin provisioned volume 430C (V1C), and data of 600I is placed on thin provisioned volume 430C (V1F).

Figure 8:
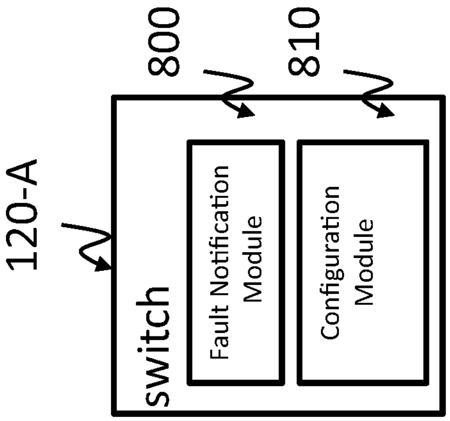
FIG. 8 shows a block diagram of an exemplary embodiment of logical elements of a switch in a computer system.

FIG. 8 shows an example of logical elements that may be included in switch 120A. In the example, switch 120A includes a fault notification module 800 and a configuration module 810. In an embodiment, fault notification module 800 sends notifications to DRAS 160 via Out-of-Band Network 150 when switch 120A cannot maintain connections between hosts and storage systems due to failure of the switch. Each notification includes an identifier of the network where the connections are lost.

Configuration module 810 sends identifiers of networks to which switch 120A is connected and identifiers of affected switch 120A when it receives requests from DRAS 160. Configuration module 810 can also send identifiers of particular network interfaces 170 and 180 and identifiers of networks to which the interfaces are connected.

In an embodiment, DRAS 160 can change a configuration such as zone configuration of switches 120 via configuration module 810. In embodiments, each switch 120 may include modules that are different from other switches. However, for ease of description of the following examples, it can be assumed that switches 120B-120D have the same module as switch 120A.

Figure 9B:
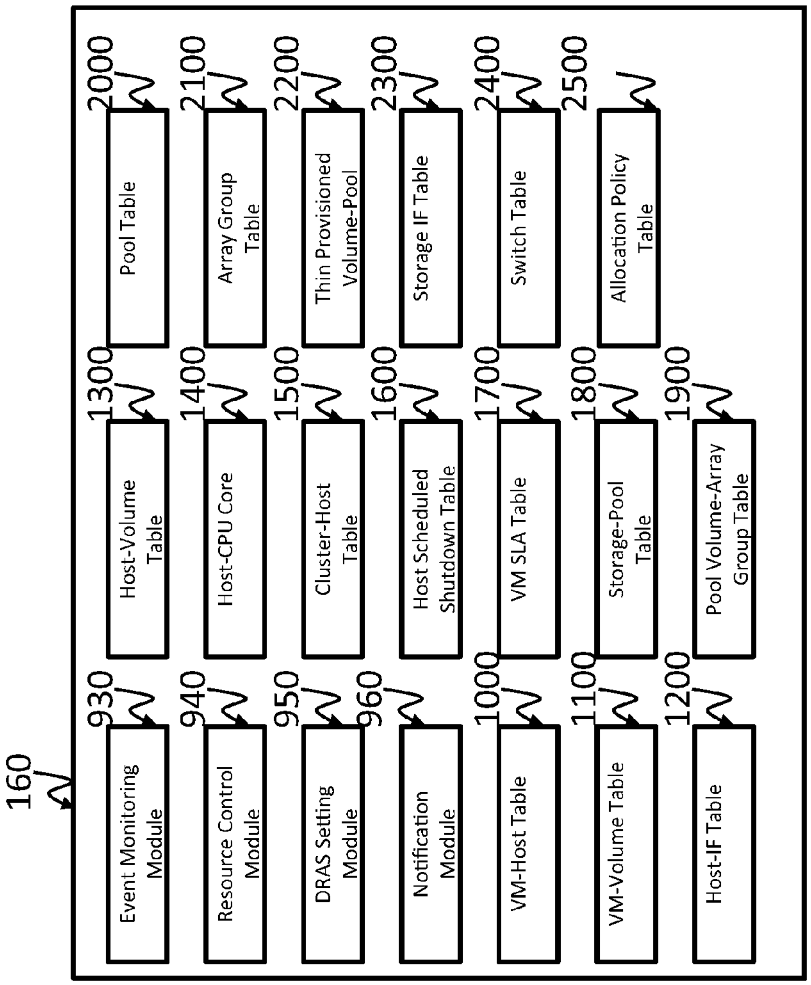
FIG. 9B shows a block diagram of an exemplary embodiment of modules and tables included in a dynamic resource allocation server.
Figure 9A:
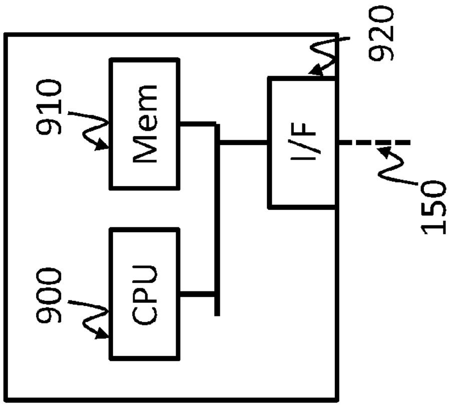
FIG. 9A shows a block diagram of an exemplary embodiment of hardware architecture of a dynamic resource allocation server.

FIG. 9A shows hardware system wherein DRAS 160 is implemented according to an embodiment of the present invention. The hardware system is a general purpose computer including CPU 900, memory 910, and network interface 920. Although not shown, computers typically include a storage device such as a hard drive disk. The storage network interface 920 connects DRAS 160 to Out-of Band Network 150. In the present embodiment, DRAS 160 is a software module running on the computer.

FIG. 9B shows logical elements of an embodiment of DRAS 160. In the embodiment, an event monitoring module 930 receives notifications from fault notification modules 480, 500 and 800 via Out-of Band Network 150. When event monitoring module 930 receives the notifications, it sends the notification to a resource control module 940. Data of the notifications may be formatted as shown in FIG. 9C.

Figure 9C:
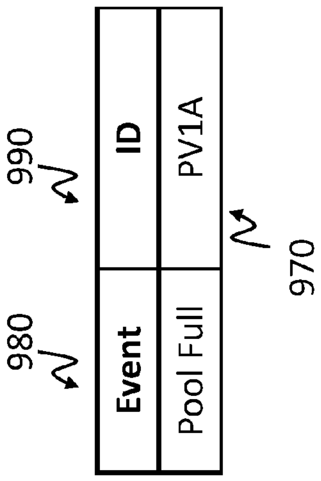
FIG. 9C shows a block diagram of an exemplary embodiment of a fault notification which may be received by a dynamic resource allocation server.

FIG. 9C shows an example of the data format of a fault notification 970. When one of the storage media 300 fails, fault notification module 480 sets an event field 980 to "Medium Fault" and adds the identifiers of the storage system and array group which include the failed medium to an ID field 990, and then sends the formatted data.

For example, when the ratio of free capacity of a pool to total capacity of pool volumes of the pool becomes less than the threshold defined in allocation policy table 2500, fault notification module 480 sets event field 980 to "Pool Full," provides the identifiers of the storage system and the pool in the ID field 990, and then sends the formatted data. In an embodiment, DRAS 160 moves the VM which has the largest data in the pool to other resources when "Pool Full" events occur.

When a switch 120 fails to maintain a connection between hosts 110 and storage systems 100 due to failure of the switch, fault notification module 800 sets event field 980 to "Switch Failure" and provides the identifier of the switch to ID field 990, and then send the formatted data.

Event monitoring module 930 monitors host scheduled shutdown table 1600, an example of which is shown in FIG. 16, and if it detects that a threshold date 1620 on the table becomes due, then it sends a notification to resource control module 940 accordingly. The notification may be formatted similar to the fault notification 970 shown in FIG. 9C. When event monitoring module 930 detects such a notification, event monitoring module 930 sets event field 980 to "Scheduled Shutdown," provides the identifier of the host to ID field 990, and then sends the formatted data.

When a resource control module 940 receives such a notification, it checks the physical resources being managed, allocates new physical resources, and moves VMs to the newly allocated resources based on the information included in the notification.

A DRAS setting module 950 allows VM administrators to provide information to VM SLA table 1700 and allocation policy table 2500. A notification module 960 sends information to VM administrators and receives replies from the VM administrators.

An embodiment includes one or more of tables 1000-2500 shown in FIG. 9B. Data tables 1000-2500 are described below as embodiments that include certain data, but one of skill in the art will recognize that other embodiments may include different data types or structures.

FIG. 10 shows an example of a data structure of VM-host table 1000. Table 1000 may include a host ID 1010 for identifying a host 120, and a VM ID for identifying a VM. Table 1000 indicates relationships between VMs and the hosts where the VMs are running. DRAS 160 may create table 1000 by accessing configuration module 510. In an embodiment, DRAS 160 does not create new clusters by using hosts listed in VM-host table.

FIG. 11 shows an example of a data structure of VM-volume table 1100. Table 1000 includes a storage ID 1110 for identifying a storage 100, a volume ID 1120 for identifying thin provisioned volumes 430, a VM ID 1130 for identifying a VM 600, and a data size of VM 1140 for identifying the size of data on a VM.

Table 1100 indicates relationships between VMs and the thin provisioned volumes where the VMs are running. In an embodiment, DRAS 160 may create this table by accessing configuration module 510. The data size of a VM may be defined as total capacity of thin provisioned chunks 450 which the VM uses. In an embodiment, data of each VM are stored in a thin provisioned volume.

FIG. 12 shows an example of a data structure of host-interface (IF) table 1200. Table 1200 may include a host ID 1210 identifying hosts 120, an IF ID 1220 identifying network interfaces 170, and a network ID 1230 identifying networks in the system. Table 1200 indicates relationships between hosts 120, their network interfaces 170, and networks to which the network interfaces are connected. DRAS 160 may create table 1200 by accessing configuration module 510.

FIG. 13 shows an example of a data structure of host-volume table 1300. Table 1300 may include a host IF ID 1310 identifying hosts 120, a storage IF ID 1320 identifying network interfaces 180, and a volume ID 1330 identifying thin provisioned volumes 430. Table 1300 may indicate relationships between thin provisioned volumes, network interfaces of storage systems connected to the thin provisioned volumes via logical paths, and network interfaces of hosts connected to the network interfaces of storage systems. DRAS 160 may create this table by accessing configuration module 510.

FIG. 14 shows an example of a data structure of host-CPU table 1400. Table 1400 may include a host ID 1410 identifying hosts 120 and a number of cores 1420 identifying the number of cores, such as cores 200-230, which are included in the hosts. DRAS 160 may create this table by accessing configuration module 510.

FIG. 15 shows an example of a data structure of cluster-host Table 1500. Table 1500 may include a cluster ID 1510 identifying clusters 600 and a host ID 1520 identifying hosts 120. Table 1500 indicates relationships between clusters and hosts which join the clusters. DRAS 160 may create this table by accessing configuration module 510.

FIG. 16 shows an example of a data structure of cluster-host Table 1600. Table 1600 may include a host ID 1610 identifying hosts 120 and a threshold date 1620. Threshold date 1620 is a date when VMs with SLA continuity fields 1770 of "On" are moved to other resources. In an embodiment, the VMs are moved by DRAS 160. Table 1600 may be created by users of DRAS 160 via DRAS setting module 950.

FIG. 17 shows an example of a data structure of VM SLA table 1700. Table 1700 may include a plurality of contents related to an SLA for VMs in a system. VM ID 1710 includes identifiers of VMs 600. Number of nodes 1720 includes a number of nodes included in a cluster 110. Number of parity disks 1730 includes a number of parity disks in a RAID array for a VM. According to an SLA, a VM may be assigned to a pool 420 which has at least the same number of parity disks as the value in this field. In an embodiment, the number of parity disks of a pool may be the number of parity disks in the array group 400 which has the smallest number of parity disks in the pool.

Number of paths 1740 may include a number of paths from a host to a thin provisioned volume. According to an SLA, data of a VM may be stored on a thin provisioned volume on the host which has the same number of paths as indicated by paths 1740. In an embodiment, the number of paths from a host to a thin provisioned volume is defined according to the following expression:

$$Np_{jkl} = \mathrm{Min}\left\{ \begin{array}{c} N\left( \bigcup_{\substack{i \in \text{ all interfaces} \\ \text{of a Host } k}} SP_{ijkl} \right), \\ N(HP_{kj}) \end{array} \right\}, \quad [1]$$

where $Np_{jkl}$ is the number of the paths from a host k to of a thin provisioned volume j of a storage system l, $SP_{ijk}$ is a set of interfaces of the storage system l which are connected to the thin provisioned volume j and the interface of the host i, $HP_{kj}$ is a set of interfaces of the host k which have any active paths to the volume j, and N is the function to calculate the total number elements of the given set.

In an embodiment, number of paths 1740 may be a number of paths from a host to a storage system, defined according to the following expression:

$$SNp_{kl} = \mathrm{Min}\left\{ \begin{array}{c} \left( \bigcup_{\substack{i \in \text{ all interfaces} \\ \text{of a Host } k}} SPN_{ikl} \right), \\ N(HP_{kl}) \end{array} \right\}, \quad [2]$$

where $SNp_{kl}$ is the number of the paths from a host k to of a storage system l, $SPN_{ikl}$ is a set of interfaces of the storage system l which are connected to the same network as the interface i of the host k, $HP_{kl}$ is a set of interfaces of the host k which have any active paths to storage system l, and N is the function to calculate the total number of elements of the given set.

Referring back to table 1700, a tier field 1750 includes the tier on which a pool is located. According to an SLA, data of a VM may be stored on the pool whose tier is included in the tier field 1750 corresponding to the VM. A core field 1760 includes the numbers of cores reserved for VMs. The SLA requires for each VM be provided with at least the number cores as defined in the tier field 1750. A continuity field 1770 includes binary values such as "On" and "Off." If the value corresponding to a VM is "On," the VM is moved on the date included in the threshold date 1620 for the host where the VM is running. If the value is "Off," the VM is not moved.

A score field 1780 includes a value which reflects an amount of SLAs corresponding to a VM that are satisfied. If the value specified in score 1780 is 100% and event occurs that breaks an SLA, a DRAS 160 may move the VM to other resources to ensure that SLAs 1720-1770 of the VM are satisfied. For example, if the value specified in this column of a VM is not 100%, DRAS 160 may calculate what percent of the SLAs of the VM is satisfied when an event occurs that could potentially affect an SLA. If the calculated value is less than the value specified in this column, DRAS 160 may move the VM to other resources in order to satisfy the SLAs. In an embodiment, SLA table 1700 is created by users of DRAS 160 via DRAS Setting module 950. In an embodiment, score 1780 includes a first value that is a current amount of SLAs that are satisfied and a second value that is a threshold, where the allocation and moving of VM are based on a relative value of the first value to the second value.

FIG. 18 shows an example of a data structure of storage-pool table 1800. Table 1800 may include a storage ID 1810 identifying storage systems 100, a pool ID 1820 identifying pools 420, and a pool volume ID 1830 identifying pool volumes 410. Table 1800 indicates relationships between pool volumes, the pools that pool volumes are included in, and storage systems to which the pools belong. DRAS 160 may create this table by accessing configuration module 490.

FIG. 19 shows an example of a data structure of storage-pool table 1900. Table 1900 may include a storage ID 1910 identifying storage systems 100, a pool volume ID 1920 identifying pool volumes 410, and an array group ID 1930 identifying array groups 400. Table 1900 indicates relationships between pool volumes, array groups reserved for the pool volumes, and storage systems to which the pool volumes belong. DRAS 160 may create this table by accessing configuration module 490.

FIG. 20 shows an example of a data structure of pool table 2000. Pool table 2000 may include a storage ID 2010 identifying storage systems 100, a pool ID 2020 identifying pools 420, a free capacity 2030 indicating a free capacity of a pool corresponding to a VM, and a total capacity 2040 indicating a total capacity of a pool corresponding to the VM. DRAS 160 may create this table by accessing configuration module 490.

FIG. 21 shows an example of a data structure of array group table 2100. Array group table 2100 may include a storage ID 2110 identifying storage systems 100, an array group ID 2120 identifying array groups 420, a free capacity 2130 indicating free capacities of array groups, a tier ID 2140 identifying tiers of array groups, and a number of parity disks 2150 indicating a number of parity disks associated with a VM. DRAS 160 may create this table by accessing configuration module 490.

FIG. 22 shows an example of a data structure of thin provisioned volume-pool table 2200. Table 2200 may include a storage ID 2210 identifying storage systems 100, a thin provisioned volume ID 2220 identifying thin provisioned volumes 430, a pool ID 2230 identifying pool volumes 410, and a free capacity 2240 indicating free capacities of thin provisioned volumes. Table 2200 indicates relationships between thin provisioned volumes, pools associated with the thin provisioned volumes, storage systems where the thin provisioned volumes exist, and their free capacities. DRAS 160 may create this table by accessing configuration module 490.

FIG. 23 shows an example of a data structure of storage IF table 2300. Table 2300 may include a storage ID 2310 identifying storage systems 100, an IF ID 2320 identifying storage interfaces 180, and a network ID 2330 identifying networks. Table 2300 indicates relationships between storages, their network interfaces, and networks to which the network interfaces are connected. DRAS 160 may create this table by accessing configuration module 490.

FIG. 24 shows an example of a data structure of switch table 2400. Table 2400 may include a switch ID 2410 identifying switches 120, and a network ID 2420 identifying networks coupled to the switches. Table 2400 indicates relationships between switches and networks which the switches join. DRAS 160 may create this table by accessing configuration module 810.

FIG. 25 shows an example of a data structure of allocation policy table 2500. Table 2500 may include an auto migration 2510, a minimum pool size 2520, a minimum thin provisioned volume size 2530, and a pool threshold 2540. Values of auto migration 2510 may include binary values such as "On" and "Off." If the value is "On," DRAS 160 automatically allocates resources and move the VM without VM administrator's approval. If the value is "Off", DRAS 160 sends notifications via notification module 960 and waits for approval from the VM administrator. Upon receiving approval, DRAS 160 allocates resources and move the VM.

In an embodiment, DRAS 160 will not create pools whose capacity is less than a value in minimum pool size 2520. Similarly, DRAS 160 may not create a thin provisioned volume whose capacity is less than a value in minimum thin provisioned volume size 2530.

Pool threshold 2540 may include a ratio of free capacity of pools. Fault notification module 480 may send notifications when the ratio of free capacity of a pool to total capacity of pool volumes of the pool becomes less than the value of pool threshold 2540. This value may be an SLA which is applied to all VMs. In an embodiment, table 2500 may be created by users of DRAS 160 via DRAS setting module 950.

Figure 29A:
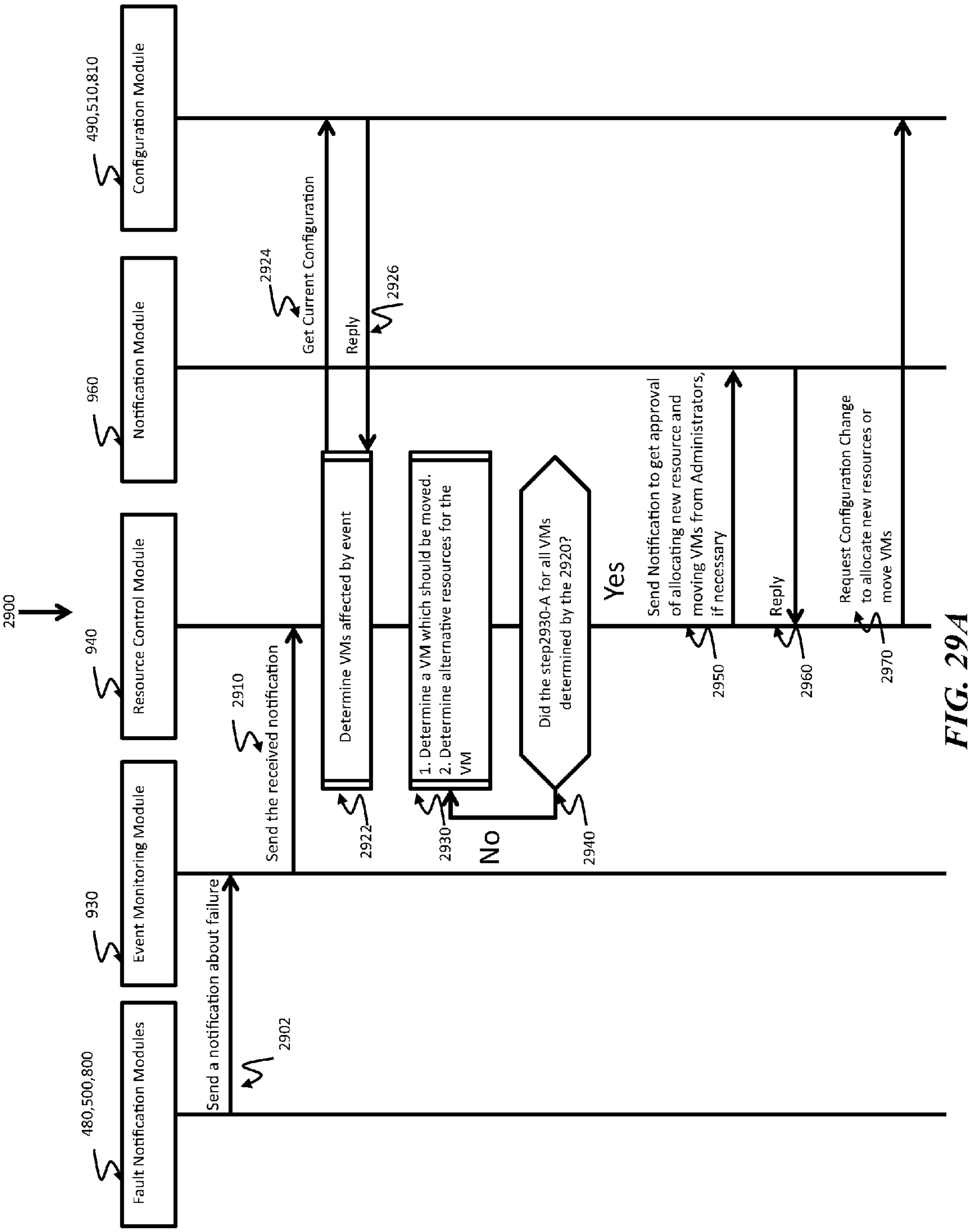
FIG. 29A shows an exemplary embodiment of a process for allocating resources for and moving a VM in response to a failure notification.
Figure 29B:
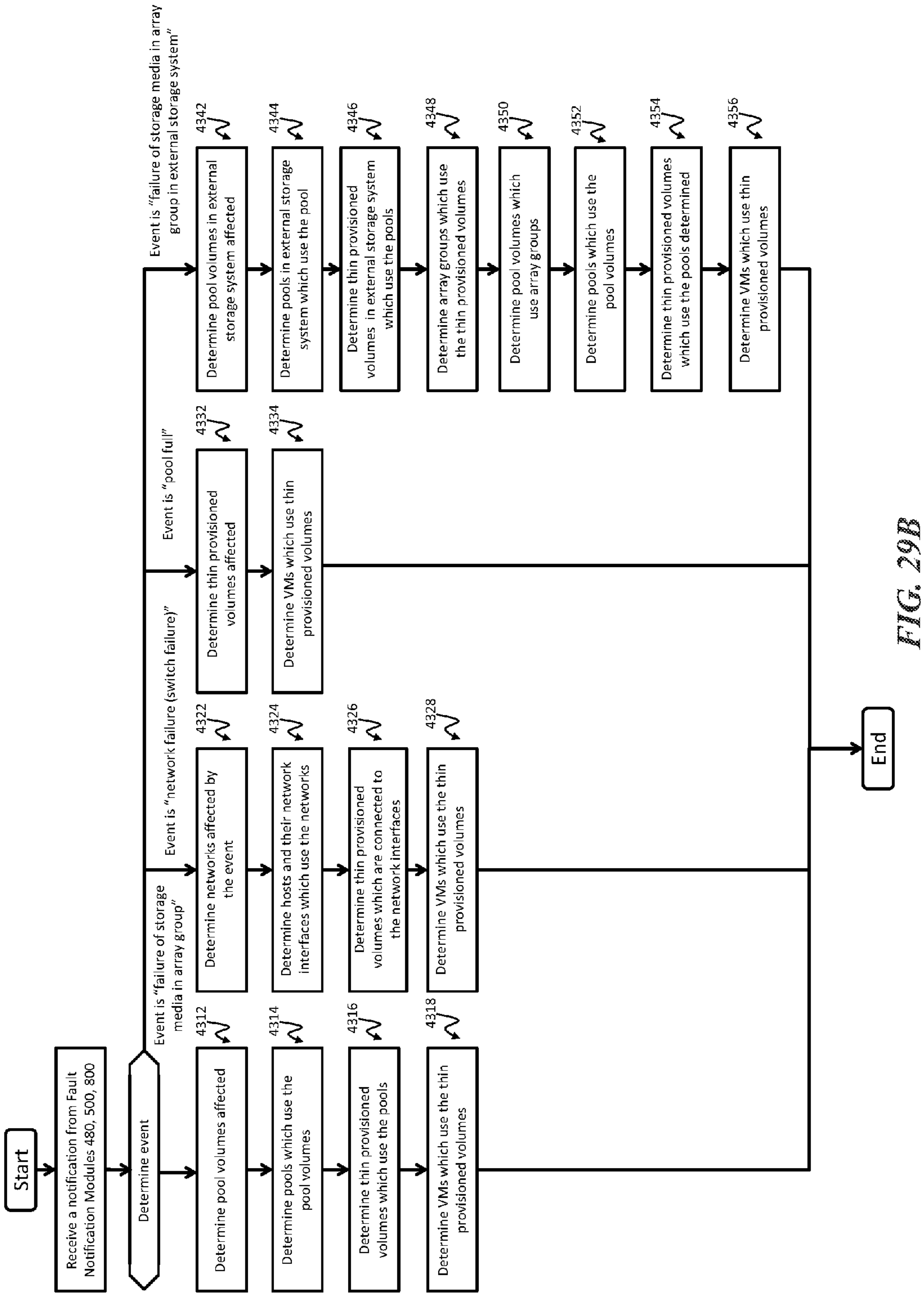
FIG. 29B shows detailed operations related to steps 2922-2926 of the process of FIG. 29.
Figure 30:
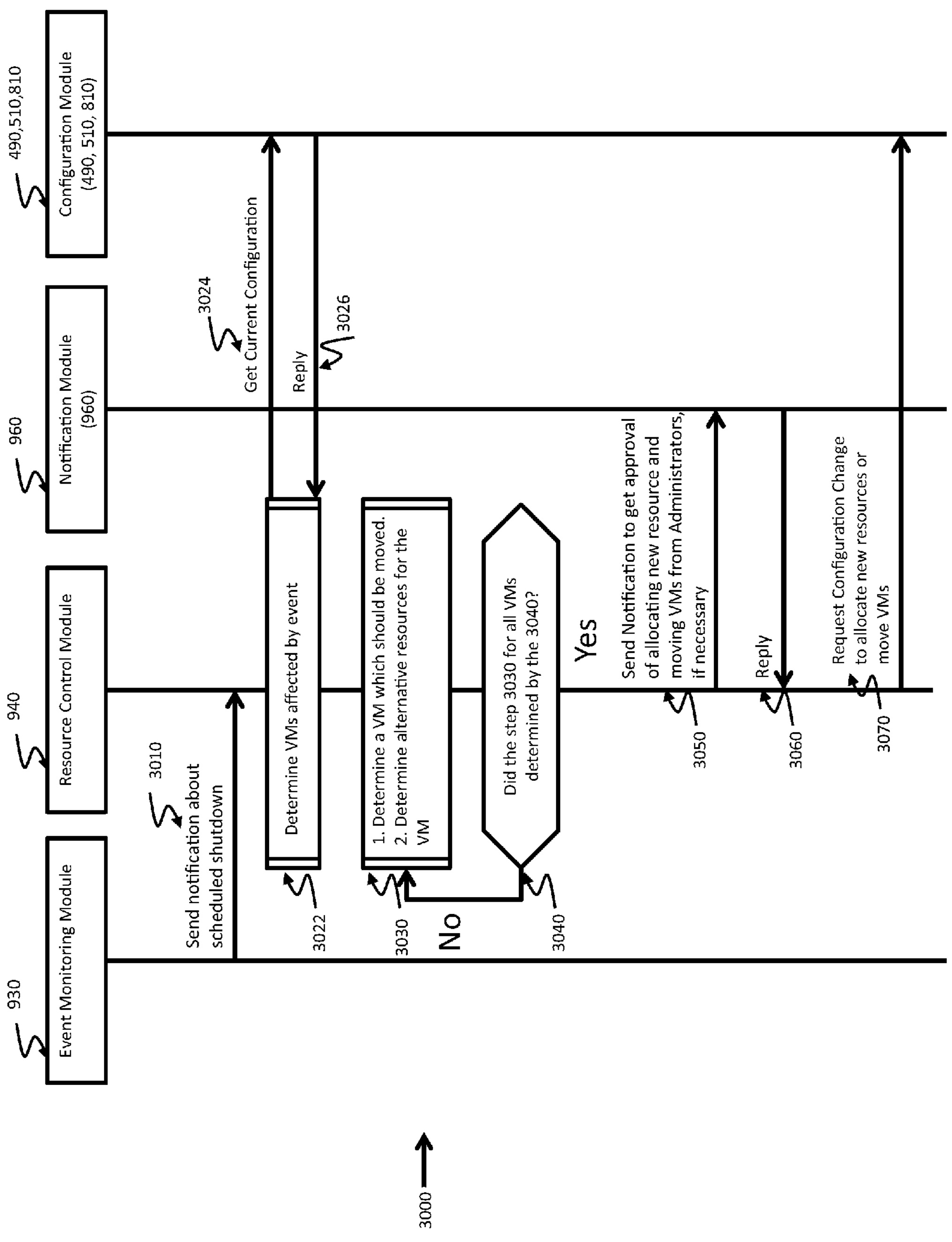
FIG. 30 shows an exemplary embodiment of a process for allocating resources for and moving a VM in response to a scheduled shutdown notification.

FIGS. 29A, 29B and 30 show exemplary processes of DRAS 160 for allocating new resources and moving VMs. FIG. 29A shows the process where fault notification modules 480, 500, and 800 detect events. FIG. 29B shows detailed steps associated with making a determination as to the affected VMs. FIG. 30 shows a process where an event is detected by the event monitoring module 930.

Referring to FIG. 29A, a process 2900 for allocating new resources and moving a VM based on a fault notification (e.g., fault notification 970) is illustrated according to an embodiment of the present invention. The fault notification may relate to a storage media failure which may include information identifying hardware associated with failed storage media or a network failure, or a request for an increase in disk size. The fault notification may also relate to a condition which breaks an SLA, or otherwise may compromise the integrity or performance of a storage system.

At step 2902, a fault is detected by one of the fault notification modules 480, 500, and 800. Upon detection of a fault event, a fault notification is sent to event monitoring module of DRAS 160. The fault notification may relate to a failure on a storage system, host, or switch. The notification may include information related to the event and identification information for hardware associated with the failure, as shown in FIG. 9C.

At step 2910, event monitoring module 930 in turn sends a fault notification to resource control module 940. The fault notification sent to the resource control module includes the information that corresponds to the fault notification received from the fault notification module at step 2902.

Steps 2922-2926 are performed to determine which VMs are affected by the event. In particular, resource control module 940 determines which VMs that are affected by the fault using information from various tables such as the tables shown in FIG. 9C (step 2922). Resource control module 960 accesses configuration module 490, 510, or 810 to get information about the configuration of hosts, storage systems, and switches (step 2924). The information may be used to update the tables. The configuration module sends configuration information to resource control module 940 in order to enable the resource control module to identify the VMs that are affected by the fault (step 2926). Steps 2922-2926 are explained in more detailed below using FIGS. 26A, 26B, and 29B.

At step 2930, resource control module 940 checks SLAs of the affected VMs. Based on the SLAs, resource control module 940 determines if any of the affected VMs should be moved. Resource control module 940 uses information in the various tables shown in FIG. 9C to make the determination. If affected VMs need to be moved, resource control module 940 searches for new resources for one of the affected VMs. If predefined or reserved resources are available for the affected VM, these resources are selected for as the new resources for the VM. Otherwise, resource control module 940 searches for alternative resources.

At step 2940, resource control module 940 determines whether or not all VMs affected by the fault notification has been addressed, and if not, step 2930 is repeated for each of the affected VMs. In an embodiment, steps 2930 and 2940 are performed separately. In another embodiment, all affected VMs are addressed in sequential order in step 2930.

At step 2950, if the auto migration field 2510 of allocation policy table 2500 includes the value "Off," resource control module 940 sends information about the affected VMs and the resources that were determined in step 2930 to VM administrators via notification module 960. If the auto migration field 2510 includes the value "On," it is not necessary to perform step 2950.

At step 2960, if resource control module 940 receives an approval from VM administrators, the process proceeds to step 2970. If a rejection is received, the process is aborted.

At step 2970, resource control module 940 sends a request to configuration module 490, 510, 810 to change a storage configuration based on the determinations made in step 2930. The configuration change includes creating new resources and/or moving the affected VMs. In an embodiment, instead of creating new resources, DRAS 160 may select existing resources and move VMs to the existing resources (e.g., predefined or reserved resources).

FIG. 30 shows s process 3000 performed for a scheduled shutdown according to an embodiment of the present invention. At step 3010, event monitoring module 930 sends information related to a scheduled shutdown to resource control module 940. The scheduled shutdown relates to a threshold date 1620 included in host scheduled shutdown table 1600, e.g., for scheduled shutdown for maintenance. Steps 3022-3070 correspond to steps 2922-2970, respectively, which are described above, and are substantially the same in the present embodiment.

Figure 26A:
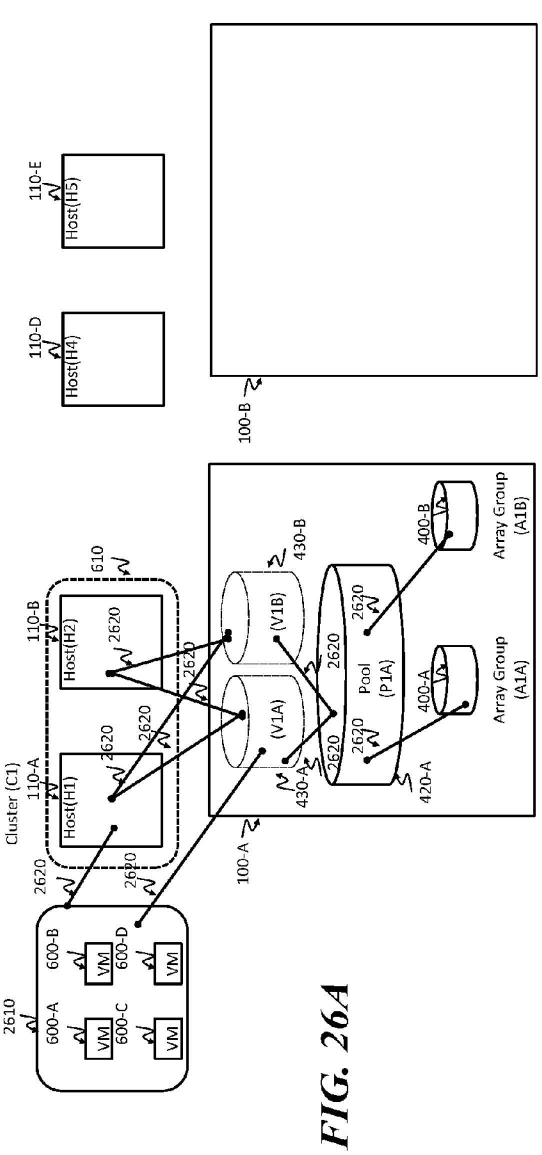
FIGS. 26A and 26B show an exemplary embodiment of dynamic allocation on a storage system.
Figure 26B:
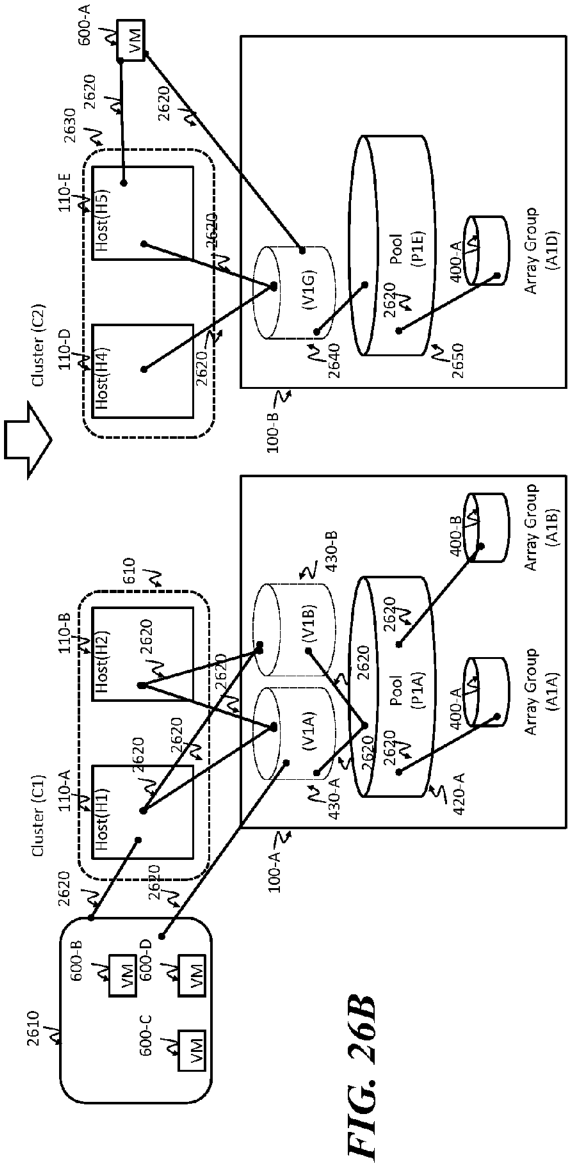

FIGS. 26A and 26B show an example of dynamic resource allocation and moving VM configurations, and operations that may be conducted when DRAS 160 receives a notification from fault notification module 480 of storage system 110A indicating a failure of storage media in array group 400A (A1A). This example uses values for tables 1000-2500 that are shown in FIGS. 10-25. Allocations for storage failure may be performed using steps shown in FIGS. 29A and 29B as discussed above.

Lines 2620 indicate logical relationships between physical or logical resources in FIGS. 26A and 26B. For example, line 2620 between host 110A (H1) and thin provisioned volumes 430A (V1A) and 430B (V1B) indicates that host H1 is associated with volumes V1A and V1B.

Referring to FIG. 29B, pool volume-array group table 1900 shown in FIG. 19 indicates that pool volume PV1A reserves array group A1A (step 4312), storage-pool table 1800 in FIG. 18 indicates that pool P1A includes pool volume PV1A (step 4314), thin provisioned volume-pool table 2200 in FIG. 22 indicates that thin provisioned volume V1A is associated with pool P1A (step 4316), and VM-volume table 1100 in FIG. 11 indicates that VMs 600A-600D (VM1-VM4) are running on thin provisioned volume V1A (step 4318). Therefore, DRAS 160 can determine that VMs VM1-VM4 are affected by the failure of array group 400A (A1A). This process of determining VMs affected by the failure corresponds to steps 2922-2926 shown in FIG. 29A.

FIG. 26A shows a configuration before DRAS 160 allocates new resources or moves VMs. In FIG. 26A, the rectangular area 2610 includes the set of VMs VM1-VM4 affected by the failure.

FIG. 26B shows a configuration after DRAS 160 has allocated new resources and moved VMs during steps 2930-2970. FIG. 26B indicates that VM 600A (VM1) has been moved from host H1 to host H5. In this example, the failure affected the number of parity disks available to VM 600A (VM1), resulting in a violation of the SLA associated with number of parity disks 1730.

By using pool volume-array group table 1900, storage-pool table 1800, and array group table 2100, DRAS 160 can determine the number of parity disks of the pool. In this case, the number of parity disks of A1A is 0.

According to VM SLA table 1700, the number of parity disks SLA for VM1 is "1," and VM2-VM4 is "0." That is, the failure resulted in a violation of the Parity SLA for VM1. Therefore, VM1 needs to be moved from pool P1A to a pool with at least one parity disk in order to satisfy the parity SLA. VM2-VM4 do not need to be moved since their SLAs were not affected by the failure.

Array group table 2100 includes free capacity 2130, which indicates the free capacity of particular array groups. Because array groups A1A and A1B in the storage system S1 do not have enough capacity to create a new pool with minimum pool size 2520 defined in FIG. 25, FIG. 26B indicates that DRAS 160 created the new pool 2650 (P1E) in storage system S2 and created the thin provisioned volume 2640 (V1G) to accommodate the new pool.

In more detail, array group table 2100 indicates that array groups A1A and A1B have free capacities of 20 gigabytes (GB). Table 2500 indicates that minimum pool size 2520 is 1 Terabyte (TB). Thus, a new pool cannot be created with array group A1A or A1B.

Although array group A1C has adequate capacity, it is a tier 2 array, which would violate the SLA associated with tier 1750 of SLA table 1700, which indicates that VM1 should be located on tier 1. Therefore, DRAS 160 creates a new pool P1E in storage system S2 with array group A/D, which according to table 2100 has adequate capacity of 1 TB and is a tier 1 array. In an embodiment, the free capacity 2130 of pools can be determined by using pool table 2000 shown in FIG. 20.

A consideration in the determination of DRAS 160 to create new cluster 2630 (C2) using hosts H4-H5 is that the hosts are connected to the same networks N3 and N4 as shown in host-IF table 1200 in FIG. 12 and storage IF table 2300 in FIG. 23. Other considerations include that H4 and H5 do not join any clusters as shown in host-cluster table 1500 in FIG. 15, and that both H4 and H5 have enough cores to satisfy with SLA associated with core 1760 for VM1 per VM SLA table 1700.

The number of cores for a host can be seen in host-CPU core table 1400 in FIG. 14, and the corresponding VM is identified in VM-host table in FIG. 10. In an embodiment, when determining the hosts, DRAS 160 may refer to host scheduled shutdown table 1600 to confirm whether potential hosts meet the Continuity SLA 1770.

Although the example shown in FIG. 26B indicates that VM1 is moved to host H5, in other embodiments VM1 can be moved to host H4 because both host H4 and host H5 have the characteristics that satisfy the SLA requirements for VM1.

Figure 27:
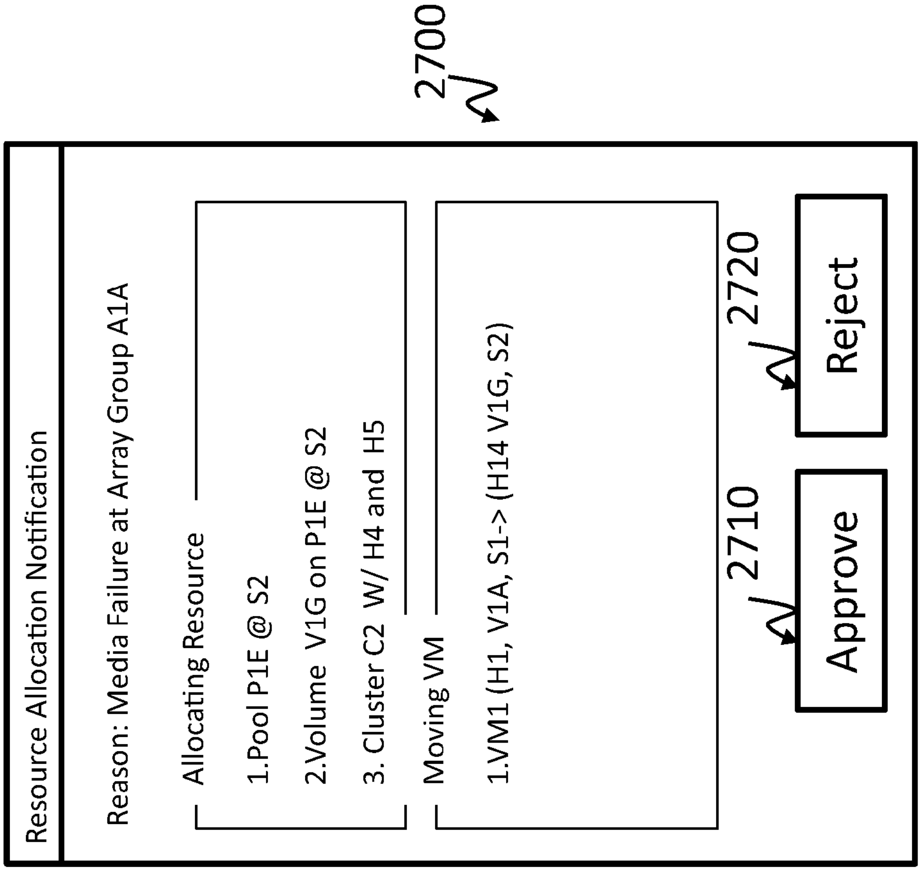
FIG. 27 shows an exemplary embodiment of a notification which may be received by a VM administrator.

If auto migration field 2510 is set as "Off" in allocation policy table 2500 when storage system 110A fails, DRAS 160 may send notification 2700 to a VM administrator including the information shown in the table of FIG. 27. This step corresponds to step 2950 of FIG. 29A.

In the above example, if the VM administrator selects an approve button 2710, DRAS 160 creates new resources and moves VM1 to the new resources. On the other hand, if the VM administrator selects a reject button 2720, the process proceeds to allocate new resources and the moving of VM1 is aborted at step 2960.

In an embodiment, if storage system S1 has pools of tier 1 and thin provisioned volumes on the pools which have sufficient free capacity to satisfy the corresponding SLA, DRAS 160 can move VM1 to one of the existing thin provisioned volumes instead of creating new resources.

In an embodiment, although DRAS 160 allocates new resources after receiving a first notification such as the notification from selecting approve button 2710, DRAS 160 may wait for arrival of other notifications related to the first notification to confirm whether the notification includes correct information or not, and then allocate new resources after successful confirmation.

An example will now be explained for dynamic allocation based on a network failure with respect to FIGS. 26A and 26B. Allocations for network failures may be performed using operations shown in FIGS. 29A and 29B as discussed above.

In an embodiment, DRAS 160 may receive a notification such as a fault notification 970 from fault notification module 800 of switch 120A (SW1) indicating that the switch cannot keep connections in In-Band Network, e.g., receive a fault notification that the number of available network paths has decreased due to a switch failure.

The VMs affected by this network failure is determined using steps 2922-2926. More specifically, referring to FIG. 29B, networks affected by the switch failure event are determined by accessing table 2400 (step 4322). Hosts and their network interfaces that use the network identified in step 4322 are determined using table 1200 (step 4324). Thin provisioned volumes that are connected to the network interfaces identified in step 4324 are determined using table 1300 (step 4326). VMs that use the thin provisioned volumes identified in step 4326 are determined using table 1100 (step 4328). For example, when switch SW1 fails, the number of paths from host H1 to thin provisioned volume 430A (V1A) where data of VMs VM1-VM4 are stored becomes 1. By using expression [1], DRAS 160 can determine that VMs VM1-VM4 are affected by this failure.

After determining the VMs that are affected by the switch failure, it is determined whether or not any SLA is violated and what resources are available for allocation according to step 2930. Referring to FIG. 17, the number of paths SLA 1740 for VM1 and is 2, so an SLA is violated by the switch failure. Therefore, new resources would need to be allocated to satisfy the number of paths requirement.

According to host-IF table 1200 shown in FIG. 12, storage IF table 2300 in FIG. 23, and switch table 2400 in FIG. 24, the number of paths from any one of hosts H1-H3 to thin provisioning volumes on storage system 100A cannot be greater than 1 in this example. Therefore, VM1 is moved to storage system 100B S2 in order to satisfy the number of paths SLA. Because there are no tier 1 pools in storage system 100B S2 and no cluster is connected to storage system 100B S2, the same allocation and moving may be performed as discussed above with respect to the storage media failure in order to satisfy the number of paths SLA of VM1.

Although FIG. 26B indicates that VM1 is moved to host H5, in another embodiment VM1 can be moved to host H4 since both host H4 and host H5 have characteristics that can satisfy the SLAs for VM1.

An example will now be explained with respect to FIGS. 26A and 29B for dynamic allocation based on an increase in data size. Allocations for increases in data size may be performed using operations shown in FIGS. 29A and 29B. In an embodiment, DRAS 160 may receive a fault notification 970 from fault notification module 480 of storage system 100A which indicates that the ratio of free capacity of pool 420A (PA1) in the storage system 100A to a total capacity of pool volumes of the pool is less than 10%.

Referring to FIG. 29B, DRAS 160 determines thin provisioned volumes affected by the event using table 2200 (step 4332) and VMs which use those thin provisioned volumes (step 4334). For example, DRAS 160 determines that VMs VM1-VM4 are affected by the fault. According to this example, array groups A1A and A1B in the storage system S1 do not have enough capacity to create a new pool with minimum pool size defined in FIG. 25 as discussed above, so DRAS 160 moves one of the VMs VM1-VM4 in the pool PA1 to storage system 100B S2. In an embodiment, DRAS moves the VM with the largest amount of data.

In an embodiment, if the decrease in the ratio is caused by increasing the data size of VM1 by more than 70 GB, DRAS 160 may perform the same allocation and migration as show in FIG. 28 during steps 2930-2970, because there are no tier-1 pools in storage system 100B S2 and there are no cluster connected to it.

Although FIG. 26B indicates that VM1 is moved to host H5, in another embodiment VM1 can be moved to host H4 since both host H4 and host H5 have characteristics that can satisfy the SLAs for VM1.

Figure 28A:
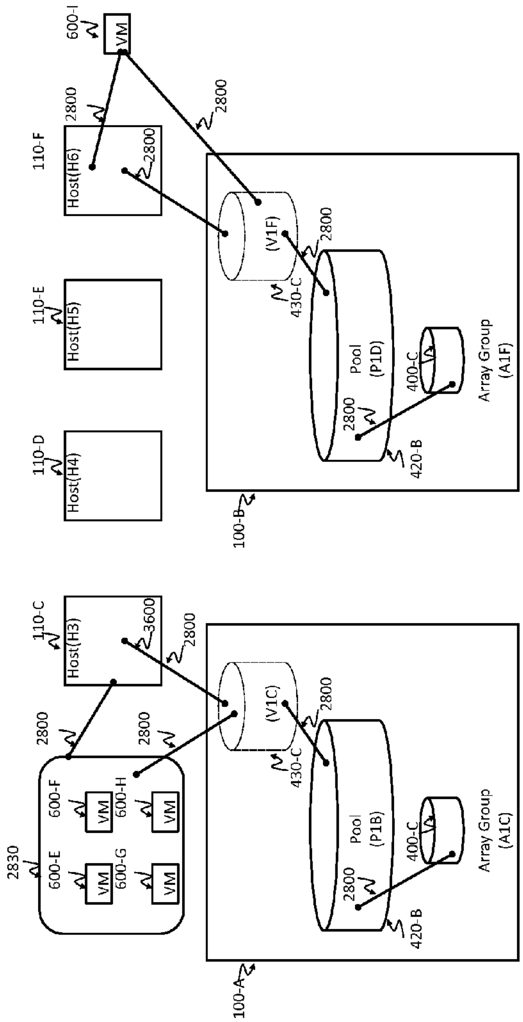
FIGS. 28A and 28B show an exemplary embodiment of dynamic allocation on a storage system.
Figure 28B:
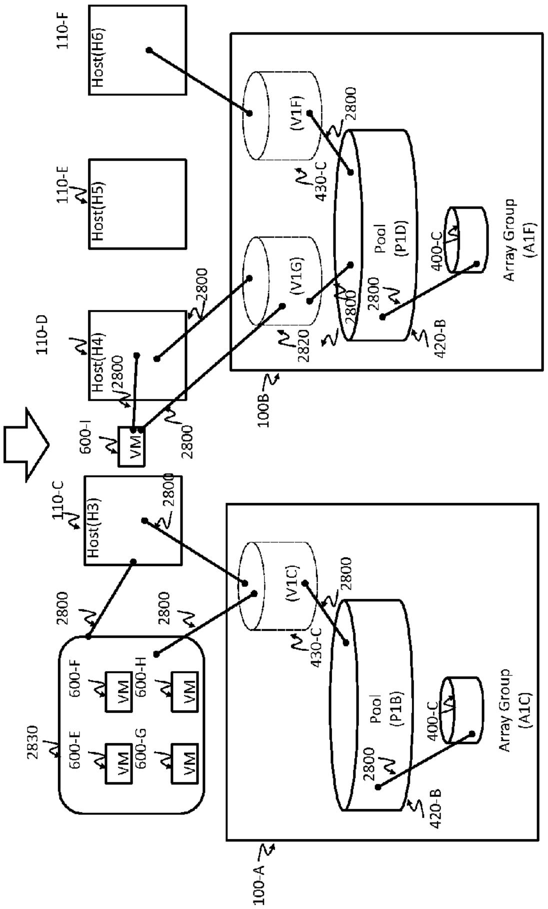

FIGS. 28A and 28B show an example of dynamic resource allocation and VM moving operations conducted by DRAS 160 when DRAS 160 receives a notification from event monitoring module 930 which indicates that one of the threshold dates 1620 of a host on host scheduled shutdown table 1600 shown in FIG. 16 becomes due. Allocations for scheduled shutdowns may be performed using steps shown in FIG. 30 as discussed above. In this example, event monitoring module 930 sends the notification about host 110F H6, and data for the operations are substantially the same as the data shown in FIGS. 10-25.

FIG. 28A indicates a configuration before DRAS allocates new resources or moves VMs, and lines 2800 indicate logical relationships between physical and logical resources. The rectangular area 2830 includes the set of VMs 600E-600H (VM5-VM8) which are running on tier 2 pool 420B (P1B).

When DRAS 160 receives the scheduled shutdown notification from event monitoring module 930, it tries to move VMs which are running on the host whose identifier is indicated in the notification to another host. In this example, the identifier in the scheduled shutdown notification is H6.

At step 3020, DRAS 160 determines the affected VMs by using VM-host table 1000 shown in FIG. 10. According to the table, VM9 is running on H6. In addition, VM SLA table 1700 indicates that Continuity SLA of VM9 is set to "On". Therefore, VM9 must be moved to other resources in order to satisfy the SLA.

The following determinations about allocation of new resources and moving VMs may be performed as part of step 3030. Candidates for the destination host include hosts H3-H5, because according to VM SLA table 1700 shown in FIG. 17, the number of nodes SLA 1720 of VM9 is 1. According to cluster-host table 1500 shown in FIG. 15, hosts H3-H5 do not belong to any clusters.

However, according to the VM SLA table 1700, VM-host table 1000 shown in FIG. 10, and host CPU core table 1400 shown in FIG. 14, all cores of host H3 are occupied by VMs VM5-VM8. Therefore, VM1 cannot be moved to host H3 without violating core SLA 1760.

Host H5 is also not appropriate candidate because host scheduled shutdown table 1600 shown in FIG. 16 indicates that a threshold date of host H5 is the same as host H6 where VM9 is currently running. Therefore, in this example, DRAS 160 determines that host H4 is the appropriate destination for VM9.

DRAS 160 may also determine that a new thin provisioned volume would need to be created on pool 420B and then allocated to host H4 since V1F is already used by host H6. In this example, it is not necessary to create new pools because pool 420B has enough free space according to VM-host table 1100 and pool table 2000 shown in FIG. 20.

FIG. 28B shows a configuration after DRAS 160 allocated new resources and moved VM9 according to step 3070. In the example, thin provisioned volume 2820 (V1G) was allocated on pool 420B (P1D) to host H4.

Figure 31:
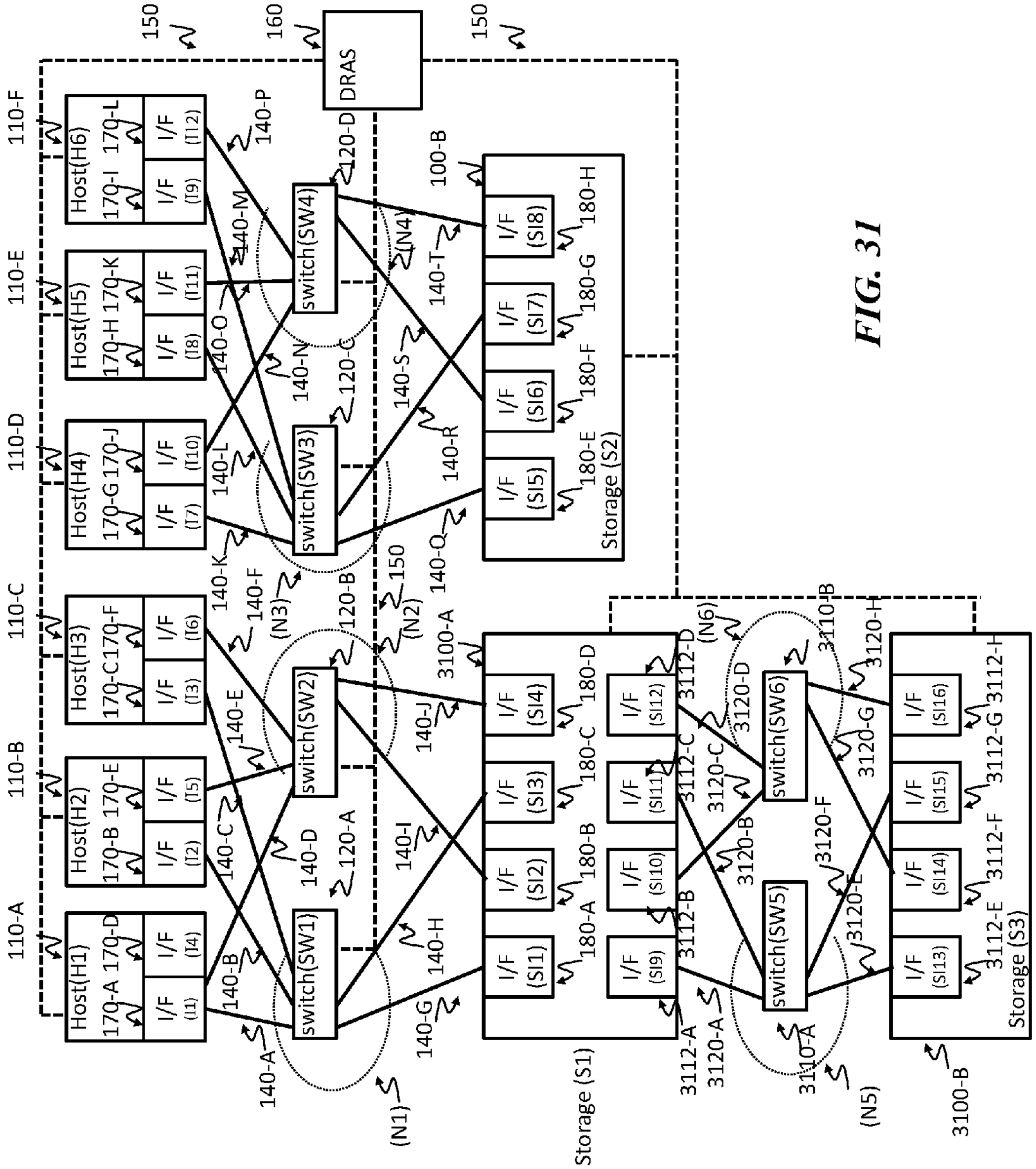
FIG. 31 shows a block diagram of an exemplary embodiment of hardware architecture of a storage system.

FIG. 31 shows an example of a physical hardware architecture of an embodiment that includes an external storage system 3100B. Many of the components in FIG. 31 are substantially the same components as FIG. 1. Differences include external storage system 3100B, switches 3110, network interfaces 3112, and their paths 3120.

Storage systems 3100A includes network interfaces 3112A-3112D, whose identifiers are SI9-S112. Storage system 3100A is connected to switches 3110 by paths 3120A-3120D. Identifiers of switches 3110 are SW5-6.

Storage system 3110B includes network interfaces 3110E-3110H whose identifiers are SI13-S16. Storage system 3100B is connected to switches 3110 by paths 3120E-3120H.

The identifier of storage system 3100B is S3. Hardware architecture of storage system S3 are similar to storage system 100A as shown in FIG. 3. One of the differences is network interfaces 3112E-3112H. Identifiers of network interfaces 3112E-3112H are SI13-SI16. Identifiers of networks coupled to switches 3110A-3110B are N5-N6.

Figure 32:
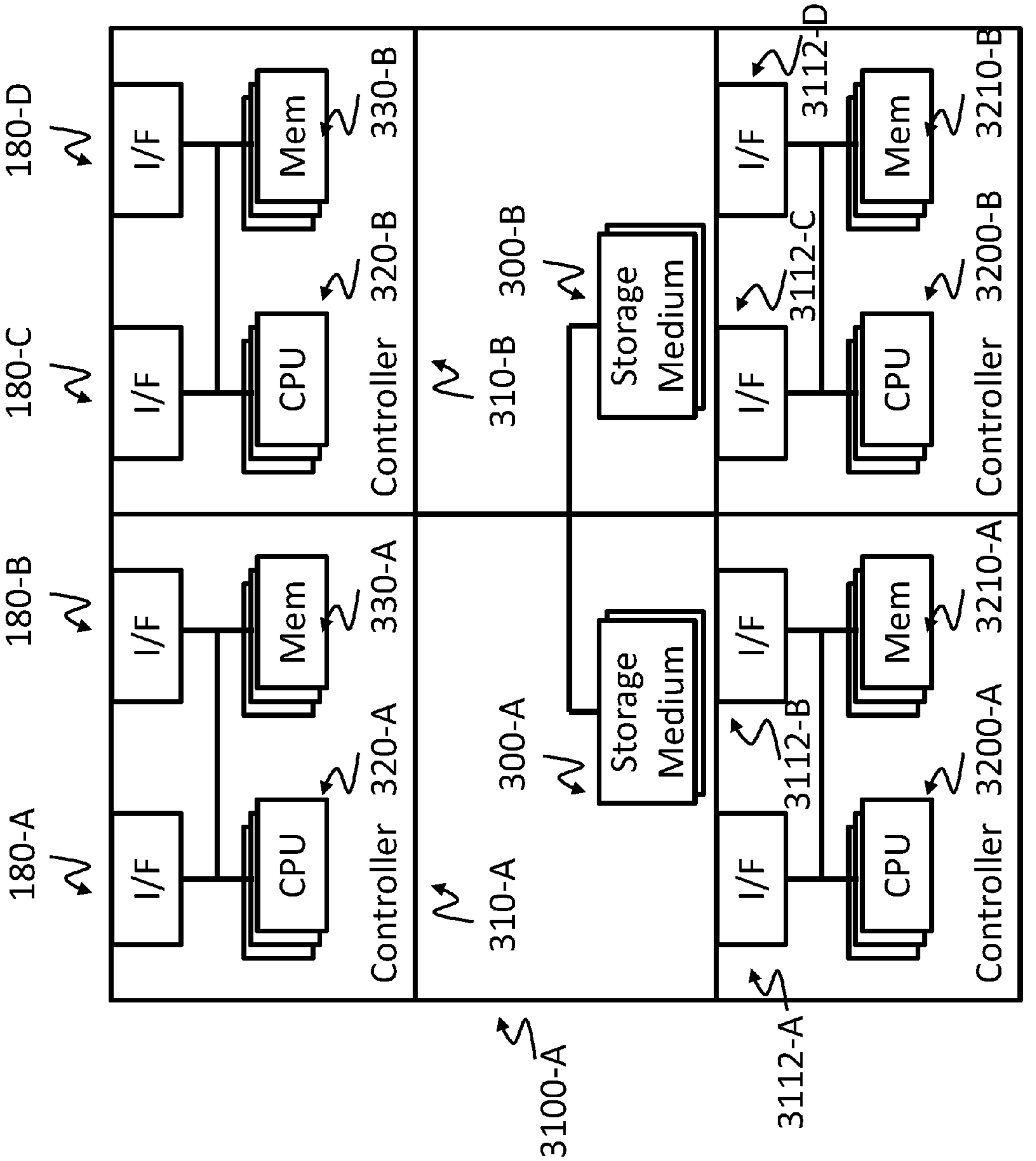
FIG. 32 shows a block diagram of an exemplary embodiment of hardware architecture of a storage system.

FIG. 32 shows an example of detailed hardware architecture of storage system 3100A. Similar to the embodiment of storage systems 100A shown in FIG. 3, storage system 3100A comprises controllers 310A and 310B. Each of the controllers 310 may include a plurality of CPUs 320, memories 330, and network interfaces 180. In addition, system 3100A comprises controllers 3110, each of which includes CPUs 3200, memories 3210, and network interfaces 3110.

Figure 33:
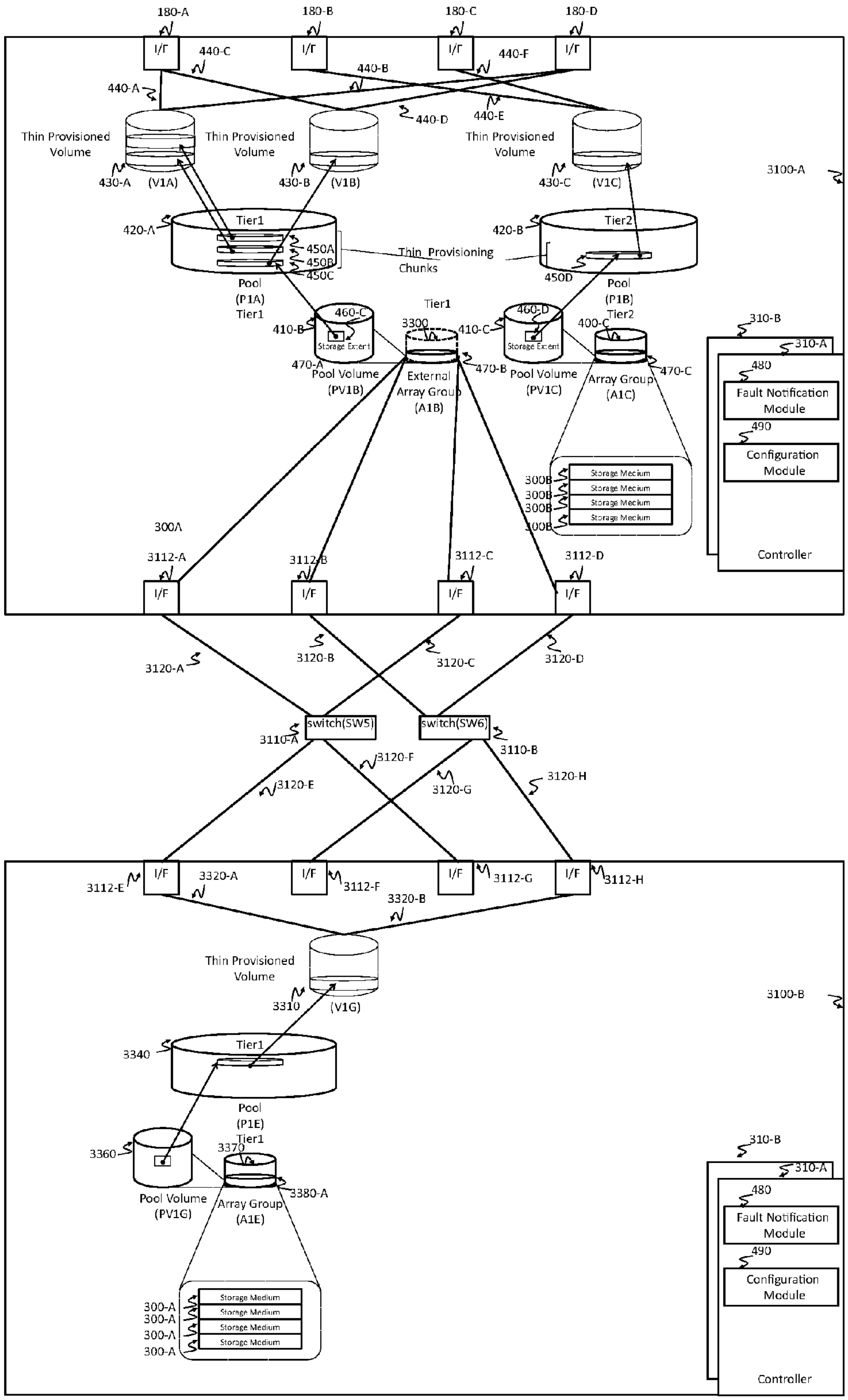
FIG. 33 shows a block diagram of an exemplary embodiment of logical architecture of a storage system.

FIG. 33 shows an example of logical elements of storage system 3100. Comparing storage system 3100 to storage system 100A shown in FIG. 4 A, although storage system 100A includes similar logical elements, storage system 3100 does not include array group 400A (A1A) or pool volume 410A (PV1A), and storage system 100A does not include external array group 3300.

Storage system 3100A does not include array group A1A or pool volume PV1A. Data written to external array group 3300 are stored on thin provisioned volume 3310 via networks N5-N6.

In this example storage system 3100B is an external storage system coupled to storage system 3100A. As shown in FIG. 33, pool volume 460C reserves a part of external array group 3300.

Storage system 3100 includes thin provisioned volume 3310, pool 3340, pool volume 3360, array group 3380A, fault notification module 480, and configuration module 490. Thin provisioned volume 3310 is associated with pool 3340 which is associated with pool volume 3360, which is associated with array group 3380.

Array group 3370 comprises storage media 300A and it is configured as RAID 5. Thin provisioned volume 3310 is connected to network interfaces 3110E and 3110D by logical paths 3320. The identifier of thin provisioned volume is V1G, the identifier of pool volume 3360 is PV1G, and the identifier of array group 3370 is A1E.

FIG. 41 shows an example of a data structure of external storage mapping table 4100. Table 4100 may include a storage system ID 4110 identifying a storage system coupled to external storage, an array group ID 4120 identifying an array group corresponding to the external storage, an external storage ID 4130 identifying the external storage system, and an external volume ID.

Table 4100 indicates relationships between array groups and thin provisioned volumes in external storage systems. DRAS 160 may create this table by accessing configuration module 490.

Figure 42A:
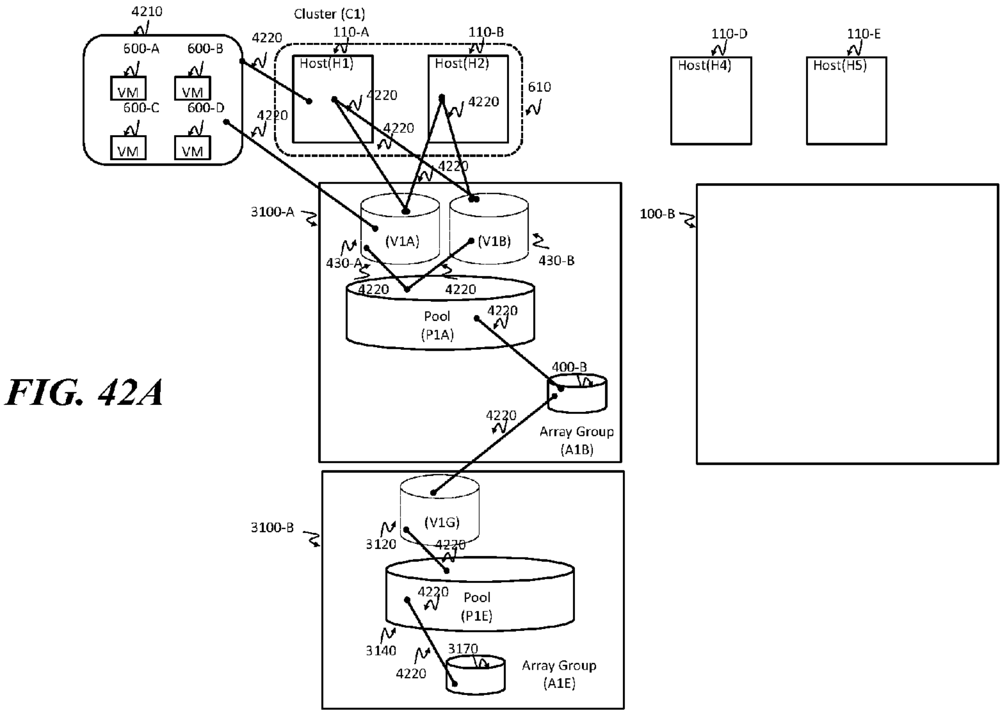
FIGS. 42A and 42B show an exemplary embodiment of dynamic allocation on a storage system.
Figure 42B:
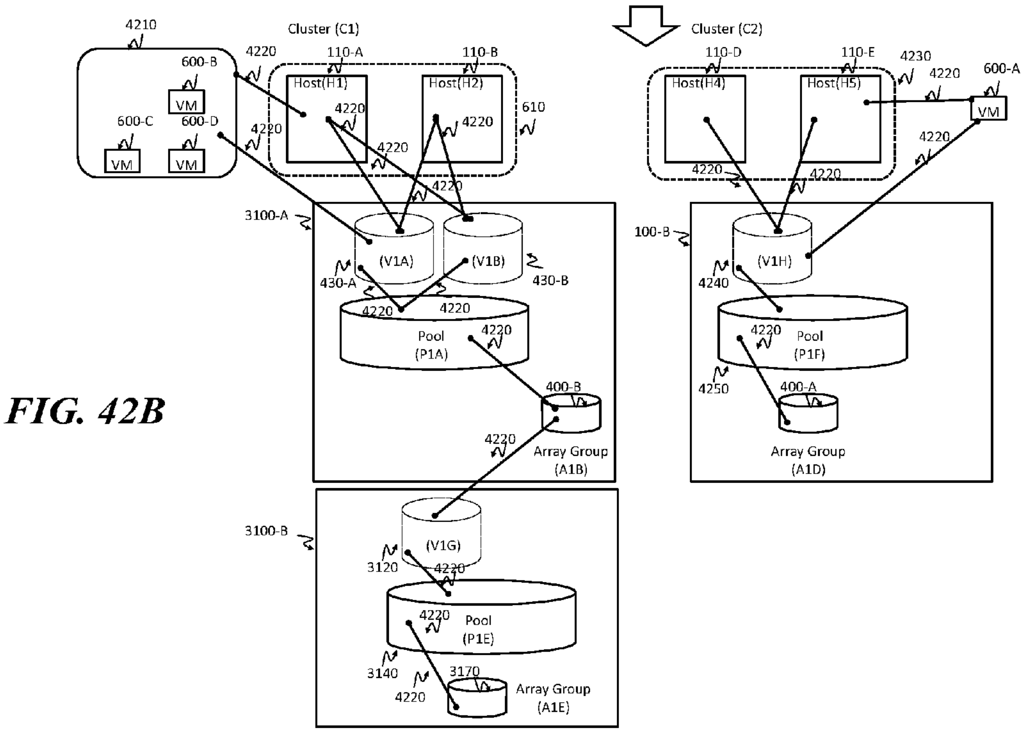

FIGS. 42A and 42B show an example of dynamic resource allocation and VM moving operations conducted by DRAS 160 when DRAS 160 receives a notification from fault notification module 480 of external storage system 3100B which indicates that one of storage media of array group 3170 (A1E) has failed. In an embodiment, allocations for failure notifications of an external storage system may be conducted by DRAS 160 in accordance with FIGS. 29A and 29B.

In the following example, tables 1000-1700 have data shown in FIGS. 10-17, tables 1800-2400 have data shown in FIGS. 34-40, and table 4100 has data shown in FIG. 41. In FIGS. 42A and 42B, lines 4220 indicate logical relationships between physical and/or logical resources.

Referring to FIG. 29B, pool volume-array group table 1900 shown in FIG. 36 indicates that pool volume PV1G reserves array group A1E (step 4342), storage-pool table 1800 shown in FIG. 34 indicates that pool P1E includes pool volume PV1G (step 4344), thin provisioned volume-pool table 2200 shown in FIG. 38 indicates that thin provisioned volume V1G is associated with pool P1E (step 4346). External storage mapping table 4100 shown in FIG. 41 indicates that array group ID A1B is associated with thin provisioned volume V1G (step 4348).

Pool volume-array group table 1900 indicates that array group A1B is reserved by pool volume PV1B (step 4350); storage-pool table 1800 in FIG. 34 indicates that pool volume PV1B is used by pool P1A (step 4352); thin provisioned volume-pool table 2200 in FIG. 38 indicates that pool P1A is used by thin provisioned volume V1A (step 4354); and VM-volume table 1100 in FIG. 11 indicates that thin provisioned volume V1A is used by VMs 600A-600D (VM1-VM4) (step 4356).

Therefore, based on the above table information, DRAS 160 can determine that VM1-VM4 are affected by the failure. This process of determining affected VMs VM1-VM4 corresponds to steps 2922-26 shown in FIG. 29A.

FIG. 42A shows a storage system configuration before DRAS 160 allocates new resources or moves VMs. In FIG. 42A, the rectangular area 4210 includes the set of the VMs VM1-VM4 that are affected by the failure.

FIGS. 42A and 42B show a configuration after DRAS 160 has allocated new resources and moved VMs during steps 2930-2970. FIG. 42B indicates that VM1 has been moved, because DRAS 160 determined that the hardware failure resulted in a violation of the number of parity disks SLA of VM1, which is "1" as shown in FIG. 17.

By using pool volume-array group table 1900, storage-pool table 1800, storage Mapping table 4100, and array group table 2100, DRAS 160 can determine the number of parity disks of a pool. In this example, because the number of parity disks 2150 for A1E in FIG. 35 is originally "1" and one of the disks has failed, the number of parity disks of A1E is reduced to 0 by the failure.

According to VM SLA table 1700, the number of parity disks SLA 1730 for VM1 is 1 and for VM2-VM4 is 0, so that SLA 1730 of VM1 is violated by the failure. Therefore, VM1 is moved from pool P1A to satisfy SLA 1730 for VM1.

Because the only tier 1 array group of storage system S1 is Group A1B, FIG. 42B indicates that DRAS 160 created new pool 4250 (P1F) in storage system S2 and created the thin provisioned volume 4240 (V1H). Reasons why DRAS 160 created new cluster 4230 (C2) by using hosts H4-H5 include that the hosts are connected to the same networks as shown in host-IF table 1200 in FIG. 12 and storage IF table 2300 in FIG. 39. In addition, as shown in host-CPU core table 1400 in FIG. 14 and VM-host table in FIG. 10, both host H4 and host H5 have enough cores to satisfy cores SLA 1760 for VM1.

Although FIGS. 42A and 42B indicate that VM1 is moved to H5, in another embodiment VM1 can be moved to H4 since both host H4 and host H5 have characteristics that can satisfy the SLAs for VM1.

The preceding has been a description of the preferred embodiment of the invention. It will be appreciated that deviations and modifications can be made without departing from the scope of the invention, which is defined by the appended claims.

What is claimed is:

1. A management server in a computer system, the computer system including one or more hosts, one or more storage systems, one or more network switches, and a plurality of resources provided using one or more of the storage systems and the network switches, the hosts having a plurality of virtual machines, each virtual machine being defined according to a service level agreement, and each storage system having a storage controller and a plurality of storage devices, the management server comprising:

a processor;

a network interface; and a memory, wherein the management server is configured to:

manage, by maintaining and using a plurality of tables of relationships between the virtual machines and resources of the plurality of resources, the virtual machines and resources associated with the virtual machines, receive a notification of an event from any one of the storage systems and network switches of the computer system, wherein the event indicates a problematic resource having one or more of a fault, an unavailability, an integrity issue, and a performance issue, the problematic resource being a resource of the plurality of resources, determine an affected virtual machine of the plurality of virtual machines using the indication of the problematic resource and the tables of relationships, the affected virtual machine being affected by the event, determine to move the affected virtual machine when the event breaks a service level agreement, the service level agreement including required attributes for the affected virtual machine, allocate a new resource for the affected virtual machine, and move the affected virtual machine to the newly allocated resource, wherein the plurality of tables of relationships include:

a first table indicating relationships between the virtual machines and thin provisioned volumes, a second table indicating relationships between the thin provisioned volumes, pools associated with the thin provisioned volumes, and the storage systems, a third table indicating relationships between array groups and pool volumes, and a fourth table indicating relationships between the pool volumes and the pools, wherein determining the affected virtual machine includes:

when the event indicates a failure of a storage media in an array group, determining using the third table that a pool volume uses the array group, determining using the fourth table that a pool uses the pool volume, determining using the second table that a thin provisioned volume uses the pool, and determining using the first table that the affected virtual machine uses the thin provisioned volume.

2. The management server of claim 1, wherein the network interface couples the management server to the hosts and the storage systems via a first network, and the hosts and the storage systems are coupled via a second network, wherein the first network is an out-of-band network, and the second network is an in-band network, and wherein management server receives the notification of the event through the out-of-band network.

3. The management server of claim 1, wherein the management server is configured to manage the service level agreements for the virtual machines, each service level agreement including one or more of the following attributes: a number of nodes included in a cluster associated with the virtual machine, a number of parity disks associated with the virtual machine, a number of paths from a host to a thin provisioned volume, a tier on which a pool is located, a number of cores reserved for the virtual machine.

4. The management server of claim 1, wherein the computer system includes a converged storage system and an external storage system coupled thereto, the converged storage system including at least one host, at least one network switch, and at least one storage system housed in a single housing.

5. The management server of claim 1, wherein the management server is operable to:

select a predefined resource for the affected virtual machine when the predefined resource satisfies the service level agreement, and move the affected virtual machine to the predefined resource, wherein the new resource is allocated if there is no predefined resource that satisfies the service level agreement.

6. The management server of claim 1, wherein the management server is operable to:

send a notification to a virtual machine administrator to obtain an approval of the newly allocated resource for the affected virtual machine.

7. The management server of claim 1, wherein the plurality of tables of relationships includes information indicating:

relationships between the network switches and the storage systems;

relationships between the virtual machines and the hosts;

relationships between the hosts and interfaces of a first plurality of interfaces;

relationships between the thin provisioned volumes and interfaces of a second plurality of interfaces;

relationships between the hosts and cores of a plurality of cores;

relationships between the storage systems and a plurality of storage pools; and relationships between the resources and attributes of the service level agreement.

8. The management server of claim 1, wherein determining the affected virtual machine further includes:

when the event indicates that a free capacity of the pool is less than a predetermined threshold, determining using the second table that the thin provisioned volume uses the pool, and determining using the first table that the affected virtual machine uses the thin provisioned volume.

9. The management server of claim 1, wherein the plurality of tables of relationships further include:

a fifth table indicating relationships between networks and network interfaces of the hosts, and a sixth table indicating relationships between the thin provisioned volumes and the network interfaces of the hosts; and wherein determining the affected virtual machine further includes:

when the event indicates a network failure, determining that an affected network is affected by the event, determining using the fifth table that a network interface of a host uses the affected network, determining using the sixth table that the thin provisioned volume is connected to the network interface, and determining using the first table that the affected virtual machine uses the thin provisioned volume.

10. A method for managing service level agreements of virtual machines in a computer system, the computer system including one or more hosts, one or more storage systems, one or more network switches, and a plurality of resources provided using one or more of the storage systems and the network switches, the virtual machines running in the hosts, each storage system having a storage controller and a plurality of storage devices, the method comprising:

maintaining a plurality of tables of relationships between the virtual machines and resources of the plurality of resources;

receiving a notification of an event, wherein the event indicates a problematic resource, the problematic resource being a resource of the plurality of resources;

determining, using the indication of the problematic resource and the tables of relationships, an affected virtual machine of the virtual machines in the computer system, the affected virtual machine being affected by the event;

determining to move the affected virtual machine when the event breaks a service level agreement, the service level agreement including required attributes for the affected virtual machine;

allocating a new resource for the affected virtual machine; and moving the affected virtual machine to the newly allocated resource, wherein the plurality of tables of relationships include:

a first table indicating relationships between the virtual machines and thin provisioned volumes, a second table indicating relationships between the thin provisioned volumes, pools associated with the thin provisioned volumes, and the storage systems, a third table indicating relationships between array groups and pool volumes, and a fourth table indicating relationships between the pool volumes and the pools, and wherein determining the affected virtual machine includes:

when the event indicates a failure of a storage media in an array group, determining using the third table that a pool volume uses the array group, determining using the fourth table that a pool uses the pool volume, determining using the second table that a thin provisioned volume uses the pool, and determining using the first table that the affected virtual machine uses the thin provisioned volume.

11. The method of claim 10, further comprising:

selecting a predefined resource for the affected virtual machine if the predefined resource satisfies the service level agreement; and moving the affected virtual machine to the predefined resource, wherein the new resource is allocated if there is no predefined resource that satisfies the service level agreement.

12. The method of claim 10, further comprising:

sending a notification to a virtual machine administrator to obtain an approval of the newly allocated resource for the affected virtual machine; and receiving the approval of the newly allocated resource for the affected virtual machine from the virtual machine administrator.

13. The method of claim 10, wherein the notification is of a shutdown of the problematic resource and is generated by an event monitoring module running in a management server.

14. The method of claim 10, wherein the plurality of tables of relationships includes information indicating:

relationships between the network switches and the storage systems;

relationships between the virtual machines and the hosts;

relationships between the hosts and interfaces of a first plurality of interfaces;

relationships between the thin provisioned volumes and interfaces of a second plurality of interfaces;

relationships between the hosts and cores of a plurality of cores;

relationships between the storage systems and a plurality of storage pools; and relationships between the resources and attributes of the service level agreement.

15. The method of claim 10, wherein determining the affected virtual machine further includes:

when the event indicates that a free capacity of the pool is less than a predetermined threshold, determining using the second table that the thin provisioned volume uses the pool, and determining using the first table that the affected virtual machine uses the thin provisioned volume.

16. The method of claim 10, wherein the plurality of tables of relationships further include:

a fifth table indicating relationships between networks and network interfaces of the hosts, and a sixth table indicating relationships between the thin provisioned volumes and the network interfaces of the hosts; and wherein determining the affected virtual machine further includes:

when the event indicates a network failure, determining that an affected network is affected by the event, determining using the fifth table that a network interface of a host uses the affected network, determining using the sixth table that the thin provisioned volume is connected to the network interface, and determining using the first table that the affected virtual machine uses the thin provisioned volume.

17. A system comprising:

one or more defined virtual machines;

one or more hosts, each host configured to run one or more of the defined virtual machines;

one or more storage systems, each storage system including a storage controller and a plurality of storage devices;

one or more network switches coupling the hosts and the storage systems;

a plurality of resources provided using one or more of the storage systems and network switches; and a management server comprising a processor, a memory, and a non-transitory computer readable medium, wherein the non-transitory computer readable medium of the management server comprises:

code for maintaining a plurality of tables of relationships between the virtual machines and resources of the plurality of resources, code for receiving a notification of an event, wherein the event indicates a problematic resource associated with one or more of a fault, an unavailability, an integrity issue, and a performance issue, code for determining, using the indication of the problematic resource and the tables of relationships, an affected virtual machine of the defined virtual machines, the affected virtual machine being affected by the event;

code for determining to move the affected virtual machine when the event breaks a service level agreement, the service level agreement including required attributes for the affected virtual machine, code for allocating a new resource for the affected virtual machine, and code for moving the affected virtual machine to the newly allocated resource, wherein the plurality of tables of relationships include:

a first table indicating relationships between the virtual machines and thin provisioned volumes, and a second table indicating relationships between the thin provisioned volumes, pools associated with the thin provisioned volumes, and the storage systems a third table indicating relationships between array groups and pool volumes, a fourth table indicating relationships between the pool volumes and the pools, a fifth table indicating relationships between networks and network interfaces of the hosts, and a sixth table indicating relationships between the thin provisioned volumes and the network interfaces of the hosts, wherein the code for determining the affected virtual machine includes:

code for, when the event indicates a failure of a storage media in an array group, determining using the third table that a pool volume uses the array group, determining using the fourth table that a pool uses the pool volume, determining using the second table that a thin provisioned volume uses the pool, and determining using the first table that the affected virtual machine uses the thin provisioned volume;

code for, when the event indicates a network failure, determining that an affected network is affected by the event, determining using the fifth table that a network interface of a host uses the affected network, determining using the sixth table that the thin provisioned volume is connected to the network interface, and determining using the first table that the affected virtual machine uses the thin provisioned volume; and code for, when the event indicates that a free capacity of the pool is less than a predetermined threshold, determining using the second table that the thin provisioned volume uses the pool, and determining using the first table that the affected virtual machine uses the thin provisioned volume.

18. The system of claim 17, wherein the management server further comprising:

code for selecting a predefined resource for the affected virtual machine if the predefined resource satisfies the service level agreement; and code for moving the affected virtual machine to the predefined resource, wherein the new resource is allocated if there is no predefined resource that satisfies the service level agreement.

19. The system of claim 17, wherein the management server further comprising:

code for sending a notification to a virtual machine administrator to obtain an approval of the newly allocated resource for the affected virtual machine; and code for receiving the approval of the newly allocated resource for the affected virtual machines from the virtual machine administrator.

* * * * *